(12) United States Patent
Ducloux

(10) Patent No.: US 10,578,436 B2
(45) Date of Patent: Mar. 3, 2020

(54) MEASURING SYSTEM AND GYROMETER COMPRISING SUCH A SYSTEM

(71) Applicant: IXBLUE, Saint-Germain-en-Laye (FR)

(72) Inventor: Eric Ducloux, Rueil Malmaison (FR)

(73) Assignee: IXBLUE, Saint-Germain-en-Laye (FR)

( * ) Notice: Subject to any disclaimer, the term of this patent is extended or adjusted under 35 U.S.C. 154(b) by 0 days.

(21) Appl. No.: 16/311,488

(22) PCT Filed: Jun. 20, 2017

(86) PCT No.: PCT/FR2017/051632
§ 371 (c)(1),
(2) Date: Dec. 19, 2018

(87) PCT Pub. No.: WO2017/220922
PCT Pub. Date: Dec. 28, 2017

(65) Prior Publication Data
US 2019/0331492 A1    Oct. 31, 2019

(30) Foreign Application Priority Data

Jun. 20, 2016  (FR) ...................................... 16 55730

(51) Int. Cl.
*G01C 19/72*      (2006.01)
(52) U.S. Cl.
CPC ................... *G01C 19/721* (2013.01)
(58) Field of Classification Search
CPC .................................................... G01C 19/72
See application file for complete search history.

(56) References Cited

U.S. PATENT DOCUMENTS

| | | | |
|---|---|---|---|
| 4,883,358 A | * | 11/1989 | Okada ................... G01C 19/72 356/463 |
| 5,331,404 A | | 7/1994 | Moeller et al. |
| 6,370,289 B1 | | 4/2002 | Bennett |

(Continued)

FOREIGN PATENT DOCUMENTS

WO    2015/128588 A1    9/2015

OTHER PUBLICATIONS

International Search Report, dated Oct. 25 2017, from corresponding PCT/FR2017/051632 application.

*Primary Examiner* — Jonathan M Hansen
(74) *Attorney, Agent, or Firm* — Young & Thompson

(57) ABSTRACT

Disclosed is a system for the interferometric measurement of a physical parameter, including an amplified spontaneous emission light source, optically connected to a Sagnac ring interferometer, and two detectors, each supplying a measurement signal representative of the light output from the interferometer, and a reference signal representative of the light output emitted by the source, which is impaired by an excess relative intensity noise. This measurement is obtained from a difference between the measurement and reference signals, weighted by a weighting coefficient which is controlled to minimise the statistical deviation of an additional weighted difference between signals obtained by demodulating the measurement and reference signals by way of an additional digital demodulation sequential code insensitive to the parameter. Also disclosed is a gyroscope including such a measuring system.

14 Claims, 7 Drawing Sheets

(56) References Cited

U.S. PATENT DOCUMENTS

| | | | |
|---|---|---|---|
| 6,429,939 B1 * | 8/2002 | Bennett | G01C 19/72 356/463 |
| 9,945,670 B2 | 4/2018 | Lefevre et al. | |
| 2004/0246488 A1 * | 12/2004 | Spahlinger | G01C 19/726 356/464 |
| 2015/0009505 A1 * | 1/2015 | Lefevre | G01C 19/721 356/460 |
| 2015/0116723 A1 * | 4/2015 | Lefevre | G01C 19/726 356/464 |

* cited by examiner

US 10,578,436 B2

MEASURING SYSTEM AND GYROMETER COMPRISING SUCH A SYSTEM

TECHNICAL FIELD TO WHICH THE INVENTION RELATES

The present invention relates to optical metrology by interferometric methods.

It more particularly relates to an interferometric measurement system making it possible to reduce the influence of the intensity noise that affects the light wave emitted by the wide spectrum source used in this measurement system.

The invention finds a particularly advantageous application in the making of an interferometric fibre-optic gyroscope comprising such a measurement system and in the making of an inertial attitude or navigation unit using such a gyroscope.

TECHNOLOGICAL BACK-GROUND

As known (see in particular H. C. Lefèvre, "*The Fiber-Optic Gyroscope*", $2^{nd}$ Edition, Artech House, 2014), an interferometric fiber-optic gyroscope, also called gyrofibre (or I-FOG, or also simply FOG, or also fiber-gyro), includes the following elements:

a wide spectrum light source emitting a source light wave;
an optical router that sends a portion of the source light wave to the common input-output gate of the ring interferometer (also called Sagnac interferometer) and that directs a portion of the return wave of the interferometer to a detector; this portion of the return wave will be called the output wave of the system; this router may in particular be a 50-50 (also called 3 dB) coupler, a Y-junction or a circulator;
a polarizer on this common input-output gate, which selects the same polarization state for the input wave and for the return wave of the ring interferometer;
a beam separator-recombiner that separates the waves that will then propagate in opposite directions in the fibre coil, then interfere with each other after recombination; this coil creates the dependence to the speed of rotation $\Omega$ by Sagnac-Laue effect, and the fibre used is preferably a polarization-maintaining (PM) fibre; and
a phase modulator placed at one end of the coil.

The wide spectrum light source is preferentially a source emitting light by spontaneous emission amplified through stimulated emission (also called Amplified Spontaneous Emission, ASE). The term ASE is the term the most used today for such a type of source, but there also exist the term superluminescent (case of semi-conductor superluminescent diodes, or SLD) and the term superfluorescent (case of sources using a rare-earth-doped fibre, also called Superfluorescent Fibre Source, or SFS). The preferentially used rare earth is the Erbium, of chemical symbol Er, that emits in the wavelength window 1525 nm-1565 nm. Indeed, this is the technology used in optical telecommunication with the erbium-doped fiber amplifiers, or EDFAs.

The polarizer, separator-recombiner and modulator unit, is preferentially made with a multi-function integrated-optic circuit, or MIOC, on an electro-optical substrate made of lithium niobate ($LiNbO_3$) and the guides are manufactured by annealed proton exchange, or APE. Rather than a single phase modulator, there is a pair of modulators, connected in push-pull, on the 2 branches of the Y junction that performs the function of separator-recombiner.

The gyroscope also comprises:
the detector that receives from the router the output wave of the system and transforms it into an analog electrical measurement signal;
an analog-to-digital converter that transforms this analog electrical signal into a digital measurement signal, this analog electrical signal having been previously amplified, but also frequency filtered, to respect the Shannon criterion of the digital sample;
a digital signal processing unit that analyses this digital signal to extract therefrom the parameter to be measured, hence the speed of rotation $\Omega$ of the coil in the case of a gyroscope, and that provides the control voltage of the phase modulator via a digital-to-analog converter and an analog amplifier.

The use of an Amplified Spontaneous Emission light source in such a measurement system has many advantages.

Firstly, such a light source generates directly the light in a single-mode guide, which allows an efficient coupling of the source light wave into the different components that include fibres or single-mode guides. Such an ASE source is said to have a high spatial coherence.

On the contrary, due to its wide spectrum, such a source has a low temporal coherence, which, in the system, allows reducing a great number of spurious phenomena linked to coherence: effect of the backscattering and of the back-reflections, effect of the rejection insufficiency of the polarizer, non-linear Kerr effect.

However, a spontaneous emission light source amplified through a stimulated emission, hence an ASE source, emits a wave whose light power is subject to different sources of noise.

First, one knows photon noise, which is a shot noise and which represents the minimum fundamental noise, for any type of light wave. The photon noise is a white noise having a noise power density that is directly linked to the light power of the wave.

More precisely, the photon noise has a noise power density (a Power Spectral Density, or PSD) that is proportional, in absolute term, to the light power, and hence proportional, in relative term, to the inverse of this light power.

For example, a light signal with a power of 30 microwatt ($\mu W$), at a wavelength of 1550 nm, has a relative photon noise power density $PSD_{ph}$:

$PSD_{ph}(30\ \mu W)=10^{-14}/Hz$, i.e. −140 decibels/Hz(− 140 dB/Hz).

The standard deviation $B_{ph}$ of the relative photon noise is also used, which is the square root of the relative photon noise power density $PSD_{ph}$, and hence, in the considered case of 30 µW:

$B_{ph}(30\ \mu W)=PSD_{ph}^{1/2}=10^{-7}/Hz^{1/2}$

For a light signal of light power 300 µW, hence ten times higher, the relative photon noise power density becomes:

$PSD_{ph}(300\ \mu W)=10^{-15}/Hz$, i.e. −150 dB/Hz i.e. −10 dB/Hz, and hence a factor 10 lower, with respect to the case of 30 µW.

On the other hand, this is only a factor square root of 10 ($10^{1/2} \approx 3$) lower, for the relative photon noise standard deviation $B_{ph}$:

$B_{ph}(300\ \mu W)=PSD_{ph}^{1/2} \approx 0.3 \times 10^{-7}/Hz^{1/2}$

Besides, The light wave emitted by a wide spectrum source has an intensity noise, i.e. fluctuations of the light power, coming in addition to the photon noise. This intensity noise is more precisely called excess Relative Intensity Noise, or excess RIN, or simply RIN. This excess noise, coming in addition to the photon noise, will be hereinafter simply referred to as the intensity noise, or RIN, that affects the light wave.

This intensity noise (or RIN) is also a white noise, for the relatively low frequencies used in practice in the processing of the gyrofibre signal (at most a few MHz). Indeed, it may be considered that the RIN is a white noise for frequencies lower than the tenth of the Full Width at Half Maximum (FWHM) of the optical frequency spectrum of the wave, i.e. 100 to 300 gigahertz (GHz) for an FWHM-f in frequency of 1 to 3 terahertz (THz), which corresponds, in wavelength, to an FWHM-λ of 7 to 20 nm around 1550 nm.

The intensity noise (or RIN), that affects a wide spectrum light wave, has hence at the low frequencies a relative noise power density, $PSD_{RIN}$, that is constant as a function of the frequency, and approximately equal to the inverse of the Full Width at Half Maximum of the optical frequency spectrum (FWHM-f), i.e.:

$$PSD_{RIN} \approx 1/\text{FWHM-}f.$$

This law according to 1/FWHM-f comes from the fact that the intensity noise (or RIN) is due to the random beats between all the different frequency components of the continuous wide spectrum of the light wave, these different frequency components interfering with each other with random phases. This noise is the result of an autocorrelation law and its noise power density $PSD_{RIN}(f)$ begins at the null frequency, then decreases and has a width at half maximum substantially equal to that of the optical spectrum of the light source, this optical spectrum being on the other hand centred around a very high frequency: about 200 THz, for a wavelength of 1550 nm.

Hence, the same light signal of 30 μW of light power that would have a full width at half height, FWHM-λ, of 7.5 nm around 1550 nm in wavelength, i.e., in optical frequency, an FWHM-f of 1 THz, hence of $10^{12}$ Hz, around 200 THz, would have, at low frequency, a constant relative intensity noise, hence RIN, power density, $PSD_{RIN}$:

$$PSD_{RIN}(7.5 \text{ nm}) \approx 1/(10^{12} \text{ Hz}) = 10^{-12}/\text{Hz, i.e. } -120 \text{ dB/Hz}$$

which is hence 20 dB/Hz higher than the relative photon noise power density, $PSD_{ph}$, of −140 dB/Hz. In noise standard deviation, $B_{RIN}$, this will be a factor 10 higher:

$$B_{RIN}(7.5 \text{ nm}) = PSD_{RIN}^{1/2} \approx 10^{-6}/\text{Hz}^{1/2}$$

when: $B_{ph}(30 \text{ μW}) = PSD_{ph}^{1/2} = 10^{-7}/\text{Hz}^{1/2}$.

In standard deviation, the relative intensity noise is independent of the optical power, but, on the contrary, the absolute intensity noise is proportional to this optical power. In noise power density, hence in square of the standard deviation, it is always independent of the optical power, in relative term, but, on the contrary, it is always proportional to the square of the optical power in absolute term.

For a power of 300 μW, hence 10 times higher than the 30 μW of the preceding example, the relative intensity noise power density remains $PSD_{RIN} = 10^{-12}$/Hz, i.e. −120 dB/Hz, and it will be a factor 1000 higher than that of the relative photon noise, and a factor square root of 1000, hence about 30, in standard deviation.

The intensity noise (or RIN) affecting a wide spectrum light wave produced by spontaneous emission amplified through stimulated emission (ASE) is the dominant source of noise in a gyrofibre, but it is possible to compensate for it. Indeed, once generated randomly by the source, the intensity noise (RIN) thereafter behaves as a usual deterministic intensity modulation:

this intensity noise remains identical, in relative term, when the light wave is split into several portions, and the power fluctuations linked to this intensity noise propagate without deformation in an optical fibre, for the frequencies lower than the bandwidth of this fibre, which is the case in practice in a gyrofibre. Indeed, as already mentioned, the processing of the signal operates at rather low frequencies (a few megahertz at most) when the bandwidth of the several kilometres single-mode fibre used is of several hundreds of gigahertz.

It is hence possible, from a source wave $W_S$, having a power, herein called source light power, $P_S$, to draw a reference wave $W_{REF}$ (that is to take a portion of the source wave $W_S$ to obtain the reference wave $W_{REF}$), that has a so-called reference light power, $P_{REF} = a_{REF} \cdot P_S$, where $a_{REF}$ is the coefficient of drawing of the reference drawn from the source. The power $P_S(t)$ of the source may be expressed from an ideal power without RIN, $P_{S\text{-}ID}$, and a multiplier coefficient $M_{RIN}(t)$ representing the relative temporal fluctuations that are due to the RIN, which is a relative noise. These fluctuations behave, as just seen, as a deterministic intensity modulation, and hence:

$$P_S(t) = P_{S\text{-}ID}(1 + M_{RIN}(t)).$$

The reference power $P_{REF}$ will follow the same relative temporal fluctuations $M_{RIN}(t)$, with:

$$P_{REF}(t) = a_{REF} \cdot P_{S\text{-}ID}(1 + M_{RIN}(t)).$$

Now, the output wave $W_{OUT}$, of power $P_{OUT}$, also carries these same relative temporal fluctuations $M_{RIN}(t)$, due to the RIN, with a time delay τ linked to the propagation in the interferometric system, hence:

$$P_{OUT}(t) = P_{OUT\text{-}ID}(1 + M_{RIN}(t-\tau)).$$

The ideal output power (hence without RIN), $P_{OUT\text{-}ID}$, is linked to the ideal power (hence without RIN) of the source, $P_{S\text{-}ID}$, by an attenuation coefficient $a_{OUT}$ that depends on the attenuation of the different components of the measurement system, as well as the response of the ring interferometer to a phase difference Δϕ:

$$P_{OUT\text{-}ID} = a_{OUT}(1 + \cos \Delta\phi) \cdot P_{S\text{-}ID}.$$

This phase difference Δϕ is the sum of:

a phase difference $\Delta\phi_\Omega$ between the two counter-propagating waves propagating in the interferometer, generated by the parameter to be measured, and a phase difference $\Delta\phi_m$ between these two waves, periodically modulated, applied by the phase modulator.

The output power, $P_{OUT}$, is converted into an analog electrical signal $S_{OUT}$, with a first detector and a first electronic chain having an optical-to-electrical conversion gain $g_{OUT}$. The reference power, $P_{REF}$, is, for its part, converted into an analog electrical signal $S_{REF}$ with at second detector and a second electronic chain, having an optical-to-electrical conversion gain $g_{REF}$.

Hence, one obtains:

an analog electrical reference signal $S_{REF}(t)$, proportional to the power of the source $P_S(t)$, and hence impaired by relative variations $M_{RIN}$ linked to the intensity noise of the source: $S_{REF}(t) = g_{REF} \cdot a_{REF} \cdot P_{S\text{-}ID} \cdot (1 + M_{RIN}(t))$, as well as an analog electrical measurement signal $S_{OUT}(t)$, dependant on the parameter to be measured Ω, and impaired by the same relative variations $M_{RIN}$, linked to the intensity noise of the source, but delayed by the time τ of propagation in the interferometric system:

$$S_{OUT}(t)=g_{OUT}\cdot a_{OUT}\cdot(1+\cos\Delta\phi)\cdot P_{S\text{-}ID}\cdot(1+M_{RIN}(t-\tau)).$$

It is hence possible to compensate for the RIN effect, impairing the measurement signal $S_{OUT}(t)$, by subtracting the reference signal $S_{REF}(t)$, after having multiplied it by a weighting coefficient β that balances the two optical-to-electrical conversion chains, as well as after having compensated for the delay τ in the interferometer. This weighting coefficient β balances, in absolute term, the intensity noise on the measurement signal and that on the reference signal (that are the same in relative term). A compensated output signal $S_{OUT\text{-}COMP}(t)$ is obtained:

$$S_{OUT\text{-}COMP}(t)=S_{OUT}(t)-\beta\cdot S_{REF}(t-\tau).$$

The compensation for the delay τ, i.e. the resynchronization of the reference signal with the measurement signal, may be performed with an optical delay line, as proposed in U.S. Pat. No. 5,331,404, or with an analog or digital electronic delay, as proposed in U.S. Pat. No. 6,370,289.

Several important points have to be highlighted.

Firstly, an unpolarised ASE source, preferentially used in a gyrofibre, carries RIN, but, if a polarization state is selected, its associated RIN is fully decorrelated from that of the orthogonal polarization state. Hence, the polarization state chosen for the reference must be the same as that used in the interferometer, as explained in U.S. Pat. No. 5,331,404.

Moreover, it is preferable to choose a reference power $P_{REF}$ higher than at least 4 times the output power $P_{OUT}$, so that the relative photon noise of this reference power $P_{REF}$ is at least twice lower than that of the output wave, and has hence a negligible effect in the RIN compensation. The measurement system will hence be limited only by the theoretical photon noise of the output power $P_{OUT}$.

Then, as the intensity noise is linked to the random beats of the different spectral components of the spectrum, it is modified if the spectrum is modified between the input and the output of the interferometer. This is the case when a conventional single-mode fibre and a depolarizer that generates a corrugated spectrum are used in the coil; on the other hand, with a polarization-maintaining (PM) fibre, the spectrum is effectively maintained and the correlation between the RIN of the reference drawn at the input and the RIN of the output signal is very good.

A gyrofibre as described hereinabove is known, from U.S. Pat. No. 6,370,289. In this gyrofibre, the electronic signal processing unit processes the measurement $S_{OUT}$ and reference $S_{REF}$ signals, to compensate for the noise of the measurement signal $S_{OUT}$ caused by the relative intensity noise of the source light wave, with the noise of the reference signal $S_{REF}$ caused by the same relative intensity noise of the source light wave, so that the noise of the compensated measurement of the parameter is reduced.

U.S. Pat. No. 6,370,289 more precisely provides a method in which:

the amplitude of the measurement signal $S_{OUT}$ and the amplitude of the reference signal $S_{REF}$ are balanced so as to balance the noise power of each of these two signals in a spectral domain in which there is no sensitivity to the parameter to be measured, then the reference signal is subtracted from the measurement signal.

According to U.S. Pat. No. 6,370,289, this method however requires to perform the Fourier transform of the measurement signal and of the reference signal, which is complex.

It is also to be noted that U.S. Pat. No. 6,370,289, just as U.S. Pat. No. 5,331,404, implicitly describe a sinusoidal phase modulation $\Delta\phi_m(t)$ for biasing the response of the ring interferometer. As it is known, the output power $P_{OUT}$ of the interferometer is then modulated at the different harmonics of the modulation frequency $f_m$, and this effect must hence be compensated for by multiplying the reference signal $S_{REF}$ by these different harmonics before calculating the weighted difference between measurement signal and reference signal.

SUMMARY OF THE INVENTION

Within this context, the present invention proposes a measurement system in which the influence of the intensity noise of the source light wave, on the measurement of the physical parameter to be measured, is efficiently compensated for, or even totally eliminated, by controlling, to an optimum value, the weighting coefficient (β) intervening in this compensation. This control allows in particular compensating for the long-term or temperature evolutions of the ratio between the amplitudes of the measurement and reference signals.

More precisely, the invention proposes a system for measuring a parameter including:

an amplified spontaneous emission light source, emitting a source light wave having a source light power ($P_S$) that is impaired by an excess relative intensity noise, an optical router configured to:

draw an input light beam from said source light wave, this input light wave being directed towards a Sagnac ring interferometer including a polarizer, a separator-recombiner, a phase modulator and a polarization-maintaining fibre coil, the interferometer receiving, as an input, said input light wave whose polarization state is selected by the polarizer, and producing, as an output, a return light wave according to the same polarization state as the input light wave, the return light wave having a return light power ($P_{BACK}$) that depends on the parameter to be measured and function of a phase difference $\Delta\phi_m$ between two counter-propagating waves propagating in the interferometer, introduced by the phase modulator, draw, from said return light wave, an output light wave, this output light wave being directed towards a first optical radiation detector that delivers a measurement signal representative of an output power ($P_{OUT}$) of the output light wave, and to draw a reference light wave from said source light wave, this reference light wave having the same polarization state as the input light wave and as the return light wave, and being directed towards a second optical radiation detector that delivers a reference signal representative of a reference power ($P_{REF}$) of the reference light wave, and a digital signal processing unit adapted to process the measurement and reference signals to provide a measurement of said parameter from a compensated measurement signal ($D_{\Omega\text{-}COMP}$) that is determined by calculating a weighted difference between:

a first signal that is a function of the measurement signal, and a second signal that is a function of the reference signal, the reference signal being resynchronized with the measurement signal, a weighting coefficient (β) being applied to this second signal.

According to the invention, the digital signal processing unit is adapted to:
control the phase modulator to modulate the phase difference $\Delta\phi_m$ according to a multi-state square-wave periodic modulation,
determine the compensated measurement signal ($D_{\Omega\text{-}COMP}$) by further applying a first sequential digital demodulation code (CSDN-$\Omega$), sensitive to said parameter to be measured,
determine an additional compensated signal ($D_{RIN\text{-}COMP}$):
by calculating a weighted difference between a first additional signal, that is a function of the measurement signal, and a second additional signal, that is a function of the reference signal, the reference signal being resynchronized with the measurement signal, the same weighting coefficient ($\beta$), applied to said second signal, being applied to the second additional signal,
and by applying an additional sequential digital demodulation code (CSDN-RIN), insensitive to said parameter to be measured,
and control said weighting coefficient ($\beta$) to the optimum value ($\beta_{opt}$) that minimizes a statistical deviation $\sigma_{RIN}$ of the additional compensated signal, or reduces said statistical deviation $\sigma_{RIN}$ below a given threshold.

The digital signal processing unit is adapted to use this optimum value ($\beta_{opt}$) of the weighting coefficient to determine the compensated measurement signal ($D_{\Omega\text{-}COMP}$).

The compensated measurement signal ($D_{\Omega\text{-}COMP}$) as well as the additional compensated signal ($D_{RIN\text{-}COMP}$), may be determined by applying the corresponding sequential digital demodulation code, either before, or after having calculated said weighted difference.

Hereinafter, the invention is presented in the non-limitative case in which the sequential digital demodulation codes are applied before calculating said weighted difference.

Hence, in the following, the following case will be considered, in which:
the first sequential digital demodulation code (CSDN-$\Omega$) is applied to the measurement signal and to the reference signal, respectively, to produce the first and second signals, whose weighted difference is then calculated (to obtain the compensated measurement signal $D_{\Omega\text{-}COMP}$), and
the additional sequential digital demodulation code (CSDN-RIN) is applied to the measurement signal and to the reference signal, respectively, to produce the first and second additional signals, whose weighted difference is then calculated (to obtain the additional compensated signal $D_{RIN\text{-}COMP}$).
In the following:
the first and second signals are referred to as the demodulated measurement signal ($D_{\Omega\text{-}OUT}$) and the demodulated reference signal ($D_{\Omega\text{-}REF}$) respectively; and
the first and second additional signals are referred to as the additional demodulated measurement signal ($D_{RIN\text{-}OUT}$) and the additional demodulated reference signal ($D_{RIN\text{-}REF}$) respectively, sensitive only to the excess relative intensity noise.

As the additional sequential digital demodulation code (CSDN-RIN) is insensitive to the parameter to be measured, the additional demodulated measurement signal ($D_{RIN\text{-}OUT}$) and demodulated reference signal ($D_{RIN\text{-}REF}$) do not depend on the value of this parameter. The control of the weighting coefficient ($\beta$) to its optimum value ($\beta_{opt}$) is hence performed without being disturbed by the parameter to be measured, in particular without being disturbed by potential variations of this parameter.

It is moreover reminded that the excess relative intensity noise, also called RIN, is a white noise at the frequencies used. Moreover, in the measurement system according to the invention, the compensated measurement signal ($D_{\Omega\text{-}COMP}$(t)) and the additional compensated signal ($D_{RIN\text{-}COMP}$(t)) come from the same chain of detection-amplification-filtering-digitization of the output power ($P_{OUT}$) as well as from the same chain of detection-amplification-filtering-digitization of the reference power ($P_{REF}$). The optimum value ($\beta_{opt}$) of the weighting coefficient, determined to minimize the statistical deviation $\sigma_{RIN}$ of the additional compensated signal ($D_{RIN\text{-}COMP}$(t)) (or to reduce it below a given threshold), is hence also the value that minimizes, for the compensated measurement signal ($D_{\Omega\text{-}COMP}$(t)), the amplitude of the fluctuations caused by the RIN (or that allows reducing them below a given threshold).

On the other hand, the phase difference $\Delta\phi_m$ is herein modulated according to a multi-state square-wave periodic modulation, i.e. it is, over time, constant by portions and, of course, periodical.

Such a multi-state square-wave periodic modulation may for example be a 2-state square-wave modulation or a 4-state square-wave modulation, as described in H. C. Lefèvre, *The Fiber-Optic Gyroscope*, $2^{nd}$ edition, Artech House, 2014, pages 136-139. It may also be the so-called "2k+1" modulation described in U.S. Pat. No. 9,291,458.

The fact that the so-modulated phase difference $\Delta\phi_m$ is constant by portions makes it possible to use, for demodulating the measurement and reference signals, particularly simple sequential digital demodulation codes (CSDN-$\Omega$ and CSDN-RIN) that requires only a limited computing power.

The technique implemented in the measurement system according to the invention, based on sequential digital demodulation codes, specifically adapted to the multi-state square-wave phase modulation used, is hence very simple with respect to the approach proposed in U.S. Pat. No. 6,370,289, which requires the complexity of a spectral analysis by Fourier transform.

Moreover, thanks to the use of a multi-state square-wave phase modulation for the biasing of the interferometer, it is possible to avoid the additional multiplication of the reference signal by the measurement signal, mentioned hereinabove in the part relating to the technological background. Indeed, in this case, the output power consists of successive constant plateaux, for the different states of the square-wave modulation. There are transition peaks between these plateaux, but these peaks are eliminated by a fast switching device. These constant plateaux may have different levels, in case of a rotation, in the case of the open loop, but, in closed loop, in particular when a digital phase ramp is used, these plateaux have the same power level.

To sum up, in the measurement system according to the invention, the compensation for the RIN affecting the source light wave is hence performed in a more accurate, more reliable and at the same time simpler manner than in the above-mentioned prior art.

Moreover, controlling the weighting coefficient ($\beta$) to its optimum value ($\beta_{opt}$) makes it possible to always stay at the optimum of compensation despite evolutions of the attenuation in the interferometer, caused by variations in temperature or by an evolution over the long term.

It may also be provided, in the measurement system, that the output power ($P_{OUT}$) of the output light wave further depends on an additional parameter ($V_\pi$), that the digital signal processing unit further adapted to determine said additional parameter ($V_\pi$), based on a second demodulated measurement signal ($D_{V\pi\text{-}OUT}$) produced by applying to the measurement signal a second sequential digital demodulation code (CSDN-$V_\pi$), insensitive to the parameter to be measured ($\Omega$) and sensitive to said additional parameter ($V_\pi$), and that the additional sequential digital demodulation code (CSDN-RIN) is moreover insensitive to said additional parameter ($V_\pi$).

It may also be provided that:

the digital signal processing unit is more precisely adapted to modulate the phase difference $\Delta\phi_m$ according to a so-called "4-state" modulation, for which the phase difference $\Delta\phi_m$ has successively, during each modulation period, four constant values $\Delta\phi_{b1}=\pi-\alpha$, $\Delta\phi_{b2}=\pi+\alpha$, $\Delta\phi_{b3}=-\pi+\alpha$ and $\Delta\phi_{b4}=-\pi-\alpha$, $\alpha$ being a phase-shift lower than $\pi/2$, that in response to each of the four phase difference values $\Delta\phi_{b1}$, $\Delta\phi_{b2}$, $\Delta\phi_{b3}$, $\Delta\phi_{b4}$, a signal to be processed has four values $x_1$, $x_2$, $x_3$, $x_4$ respectively, the application of the first sequential digital demodulation code (CSDN-$\Omega$) to the signal to be processed consisting in summing the four values $x_1$, $x_2$, $x_3$, $x_4$, the four values $x_1$, $x_2$, $x_3$, $x_4$ having been multiplied, prior to this summation, by $-1$, $+1$, $+1$, $-1$ respectively, or by $+1$, $-1$, $-1$, $+1$ respectively, and that the application of the second sequential digital demodulation code (CSDN-$V_\pi$) to the signal to be processed consists in summing the four values $x_1$, $x_2$, $x_3$, $x_4$, the four values $x_1$, $x_2$, $x_3$, $x_4$ having previously been multiplied them by $-1$, $+1$, $-1$, $+1$ respectively, or by $+1$, $-1$, $+1$, $-1$ respectively.

It may be provided in particular that the phase shift $\alpha$ intervening in this 4-state modulation is comprised between $\pi/64$ and $\pi/2$.

The signal to be processed herein corresponds to the measurement signal ($S_{OUT}$), or to the reference signal ($S_{REF}$).

It may be provided in particular that, after amplification and also after an analog filtering respecting the Shannon criterion, the measurement signal ($S_{OUT}(t)$) and the reference signal ($S_{REF}(t)$) are digitally sampled at each of the four states of the above-mentioned modulation, to give respectively:

a digital signal $S_{N\text{-}OUT}(t)$ that has four digital values $S_{N\text{-}OUT\text{-}n}$ (with $n=1$ to 4), for each of these four states of modulation, and a digital signal $S_{N\text{-}REF}(t)$ that has four digital values $S_{N\text{-}REF\text{-}n}$ (with $n=1$ to 4), for each of these four states of modulation.

For the measurement signal ($S_{OUT}(t)$) the four values $x_1$, $x_2$, $x_3$, $x_4$ then correspond to the four values $S_{N\text{-}OUT\text{-}1}$, $S_{N\text{-}OUT\text{-}2}$, $S_{N\text{-}OUT\text{-}3}$, $S_{N\text{-}OUT\text{-}4}$, whereas for the reference signal ($S_{REF}(t)$) the four values $x_1$, $x_2$, $x_3$, $x_4$ correspond to the four values $S_{N\text{-}REF\text{-}1}$, $S_{N\text{-}REF\text{-}2}$, $S_{N\text{-}REF\text{-}3}$, $S_{N\text{-}REF\text{-}4}$.

The demodulated measurement and reference signals $D_{\Omega\text{-}OUT}(t)$ and $D_{\Omega\text{-}REF}(t)$, obtained by applying the first sequential digital demodulation code CSDN-$\Omega$, $-++-$, are then determined in accordance to the following formulas:

$$D_{\Omega\text{-}OUT}(t)=\text{CSDN-}\Omega(S_{N\text{-}OUT}(t))=-S_{N\text{-}OUT\text{-}1}+S_{N\text{-}OUT\text{-}2}+S_{N\text{-}OUT\text{-}3}-S_{N\text{-}OUT\text{-}4}$$

$$\text{and } D_{\Omega\text{-}REF}(t)=\text{CSDN-}\Omega(S_{N\text{-}REF}(t))=-S_{N\text{-}REF\text{-}1}+S_{N\text{-}REF\text{-}2}+S_{N\text{-}REF\text{-}3}-S_{N\text{-}REF\text{-}4}$$

(or, of course, in accordance to the formulas $D_{\Omega\text{-}OUT}(t)=\text{CSDN-}\Omega(S_{N\text{-}OUT}(t))=+S_{N\text{-}OUT\text{-}1}-S_{N\text{-}OUT\text{-}2}-S_{N\text{-}OUT\text{-}3}+S_{N\text{-}OUT\text{-}4}$ and $D_{\Omega\text{-}REF}(t)=\text{CSDN-}\Omega(S_{N\text{-}REF}(t))=S_{N\text{-}REF\text{-}1}-S_{N\text{-}REF\text{-}2}-S_{N\text{-}REF\text{-}3}+S_{N\text{-}REF\text{-}4}$).

The demodulated measurement and reference signals $D_{V\pi\text{-}OUT}(t)$ and $D_{V\pi\text{-}REF}(t)$, obtained by applying the second sequential digital demodulation code CSDN-$V_\pi$, $-+-+$, are then determined in accordance to the following formulas:

$$D_{V\pi\text{-}OUT}(t)=\text{CSDN-}V_\pi(S_{N\text{-}OUT}(t))=-S_{N\text{-}OUT\text{-}1}+S_{N\text{-}OUT\text{-}2}-S_{N\text{-}OUT\text{-}3}+S_{N\text{-}OUT\text{-}4}$$

$$\text{and } D_{V\pi\text{-}REF}(t)=\text{CSDN-}V_\pi(S_{N\text{-}REF}(t))=S_{N\text{-}REF\text{-}1}+S_{N\text{-}REF\text{-}2}-S_{N\text{-}REF\text{-}3}+S_{N\text{-}REF\text{-}4}$$

(or, of course, in accordance to the formulas $D_{\Omega\text{-}OUT}(t)=\text{CSDN-}V_\pi(S_{N\text{-}OUT}(t))=+S_{N\text{-}OUT\text{-}1}-S_{N\text{-}OUT\text{-}2}+S_{N\text{-}OUT\text{-}3}-S_{N\text{-}OUT\text{-}4}$ and $D_{\Omega\text{-}REF}(t)=\text{CSDN-}V_\pi(S_{N\text{-}REF}(t))=S_{N\text{-}REF\text{-}1}-S_{N\text{-}REF\text{-}2}+S_{N\text{-}REF\text{-}3}-S_{N\text{-}REF\text{-}4}$).

According to a conceivable embodiment, it is provided that the two demodulations performed by the first sequential digital demodulation code (CSDN-$\Omega$) and by the second sequential digital demodulation code (CSDN-RIN), respectively, are in quadrature with respect to each other.

It may then be provided, in the particular case of the "4-state" phase modulation mentioned hereinabove, that the application of the additional sequential digital demodulation code CSDN-RIN, noted in this case $++--$ (or $--++$), consists in summing the four values $x_1$, $x_2$, $x_3$, $x_4$ by having previously respectively multiplied them by $+1$, $+1$, $-1$, $-1$, or by $-1$, $-1$, $+1$, $+1$.

According to another embodiment, it is provided that the additional sequential digital demodulation code (CSDN-RIN) is sensitive to a periodic component having a frequency equal to the modulation frequency divided by an even number, in particular divided by 2.

As the RIN may herein be likened to a white noise, the optimum value ($\beta_{opt}$) of the weighting coefficient ($\beta$) is the same at the modulation frequency as at other frequencies. The additional sequential digital demodulation code (CSDN-RIN), sensitive to a frequency component different from the modulation frequency, is hence advantageously insensitive to the parameter to be measured, while making it possible to control the weighting coefficient ($\beta$) to a value that actually corresponds the value allowing the RIN to be optimally compensated for at the modulation frequency.

It may in particular be provided, in this case, for the above-mentioned "4-state" phase modulation, that the application of the additional sequential digital demodulation code CSDN-RIN, then noted $++++----$ (or $----++++$), consists in summing the four values $x_1$, $x_2$, $x_3$, $x_4$ the signal to be processed has during a modulation period, and in subtracting from them the sum of the four values $x_1$, $x_2$, $x_3$, $x_4$ the signal to be processed has during the following modulation period. The demodulation sequence used, $++++----$ (or $----++++$) hence extends over 8 successive states and hence 2 periods of the 4-state modulation.

In the case of the above-described "4-state" modulation, it is observed that the sequences of digital demodulation involve only additions or subtractions. The calculation of the demodulated signals, by means of these sequences of digital demodulation, is hence rapid to perform and introduces no error of calculation. It is the same in other multi-state square-wave modulations, such as the above-mentioned 2-state square-wave modulation or the "2k+1" modulation.

It will moreover be noted that, due to the commutativity and associativity of the addition and the subtraction, it is actually possible, as already indicated, to calculate said weighted difference either before or after application of the sequential digital demodulation codes.

It may further be provided that the application of the additional sequential digital demodulation code (CSDN-RIN) to a signal consists in applying to this signal at least one mathematical operation (for example, one of the above-described operations + + − − or + + + + − − − −), except for a Fourier transform.

The additional compensated signal ($D_{RIN-COMP}$) obtained as explained hereinabove, makes it possible to control the weighting coefficient ($\beta$) to said optimum value ($\beta_{opt}$), about which it is reminded that it minimizes the statistical deviation $\sigma_{RIN}$ of this signal.

The term "statistical deviation $\sigma_{RIN}$" herein refers to the deviation from the mean value, due to the statistical dispersion of the additional compensated signal ($D_{RIN-COMP}$), and hence representative of the amplitude of fluctuations of this signal about its mean value. The statistical deviation $\sigma_{RIN}$ of the additional compensated signal ($D_{RIN-COMP}$) may hence denote in particular the variance of this signal, its standard-deviation, or, for example, its central moment of order four. The statistical deviation $\sigma_{RIN}$ of the additional compensated signal ($D_{RIN-COMP}$) is always positive.

It may also be provided that the digital signal processing unit is adapted to determine the statistical deviation $\sigma_{RIN}$ of the additional compensated signal $D_{RIN-COMP}$ by calculating a mean of the absolute value of the difference $D_{RIN-COMP} - \langle D_{RIN-COMP} \rangle$ between the additional compensated signal $D_{RIN-COMP}$ and its mean value $\langle D_{RIN-COMP} \rangle$. The calculation of this statistical deviation $\sigma_{RIN}$ based on the absolute value may then be performed cumulatively, with the use of only limited computing resources.

In a preferred embodiment, the control of the weighting coefficient $\beta$ to said optimum value ($\beta_{opt}$) is performed by:
  calculating a difference $\Delta\sigma_{RIN}(\beta)$ between:
    a first value of the statistical deviation $\sigma_{RIN}(\beta+\delta\beta)$ of the additional compensated signal $D_{RIN-COMP}$, calculated for a first offset value $\beta-\delta\beta$ of the weighting coefficient $\beta$, and
    a second value of the statistical deviation $\sigma_{RIN}(\beta-\delta\beta)$ of the additional compensated signal $D_{RIN-COMP}$, calculated for a second offset value $\beta-\delta\beta$ of the weighting coefficient $\beta$, and by
  controlling the weighting coefficient $\beta$ so as to nullify this difference $\Delta\sigma_{RIN}(\beta)$. As the statistical deviation $\sigma_{RIN}(\beta)$ of the additional compensated signal $D_{RIN-COMP}$ is minimal for said optimum value $\beta_{opt}$, the difference $\Delta\sigma_{RIN}(\beta)$ is nullified for $\beta=\beta_{opt}$:

$\Delta\sigma_{RIN}(\beta_{opt})=\sigma_{RIN}(\beta_{opt}+\delta\beta)-\sigma_{RIN}(\beta_{opt}-\delta\beta)=0$.

Controlling in that way the difference $\Delta\sigma_{RIN}(\beta)$ to zero hence bring the weighting coefficient $\beta$ to its optimum value $\beta_{opt}$.

The difference $\Delta\sigma_{RIN}(\beta)$ crosses zero, with a change of sign, at the optimum value $\beta_{opt}$ and depends linearly on $\beta$ in the vicinity of this value. It hence provides an error signal for the RIN compensation control loop, making it possible to efficiently control the weighting coefficient $\beta$ to its optimum value $\beta_{opt}$.

Moreover, as already indicated, the determination of the statistical deviation $\sigma_{RIN}$ of the additional compensated signal $D_{RIN-COMP}$ requires only limited calculation resources, so that this control may be implemented with such resources.

Hence, it will be noted again, on the example of this embodiment, that the adjustment of the weighting coefficient $\beta$ thanks to which an efficient compensation of the RIN is obtained, is made in a far simpler way in the measurement system according to the invention than in the above-mentioned prior art.

Preferentially, the deviation $2\times\delta\beta$ between the first offset value $\beta+\delta\beta$ and the second offset value $\beta-\delta\beta$ of the weighting coefficient $\beta$ is comprised between 2% and 20% of the value of the weighting coefficient $\beta$. The applicant has indeed observed that a value of the deviation $2\times\delta\beta$ comprised in this range of values leads to an efficient control of the weighting coefficient $\beta$.

According to another additional and non-limitative characteristic, the measurement system according to the invention is adapted to apply a counter-reaction phase-shift between the two counter-propagative waves propagating in the interferometer, by means of said phase modulator, depending on the measurement signal, so as to compensate for a non-reciprocal phase-shift between the two counter-propagative waves that depends on the parameter to be measured. The measurement system is hence adapted to measure said parameter in "closed loop".

The present invention finds a particularly advantageous application in the making of a fibre optic gyroscope including a measurement system as described hereinabove, intended to measure a component of the speed of rotation of the gyroscope, about an axis of rotation parallel to the axis of the fibre coil.

Hence, the present invention also relates to a gyroscope including a measurement system according to the invention, the physical parameter to be measured then corresponds to said speed of rotation ($\Omega$) of the gyroscope.

The present invention moreover relates to an inertial attitude or navigation unit including at least such a gyroscope.

The invention may also find an application in the making of an electrical current or magnetic field sensor including a measurement system according to the invention, intended to measure a phase difference produced, in the SAGNAC ring interferometer, by FARADAY effect.

DETAILED DESCRIPTION OF AN EXEMPLARY EMBODIMENT

The following description, in relation with the appended drawings given by way of non-limitative examples, will allow to understand in what consists the invention and how it may be made.

Figure 1:
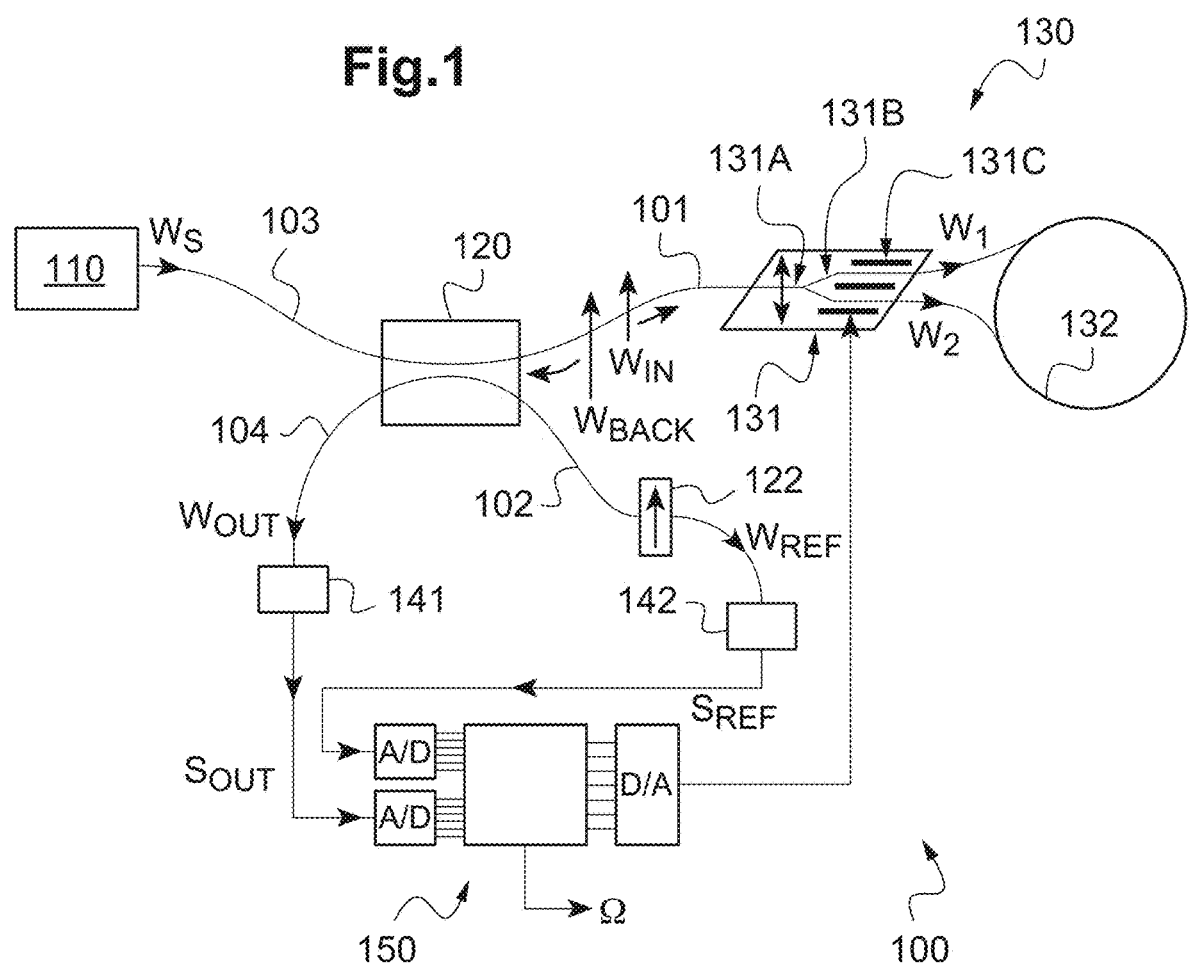
FIG. 1 is a schematic view of a measurement system according to a first embodiment of the invention.
Figure 2:
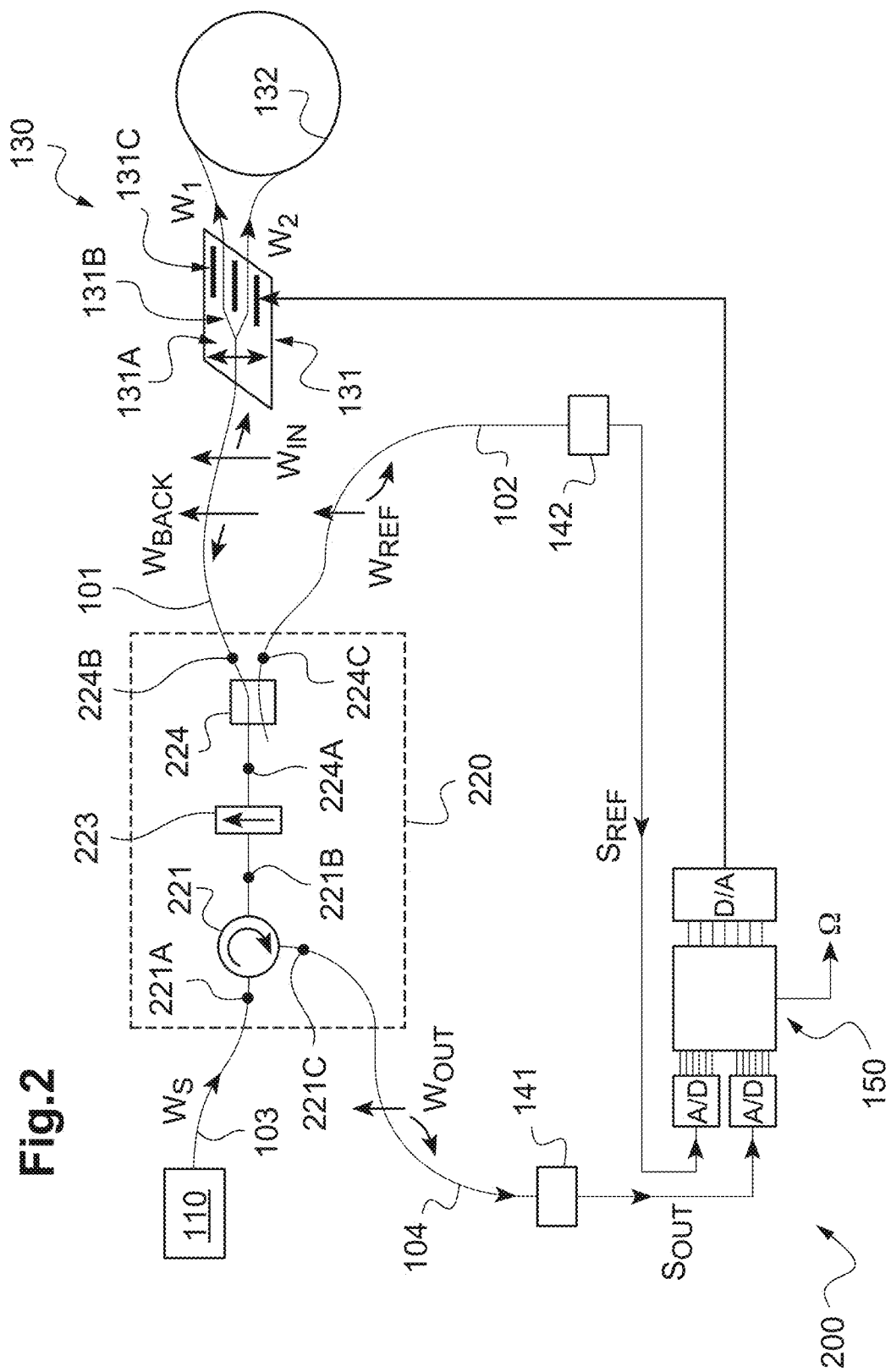
FIG. 2 is a schematic view of a measurement system according to a second embodiment of the invention.
Figure 3:
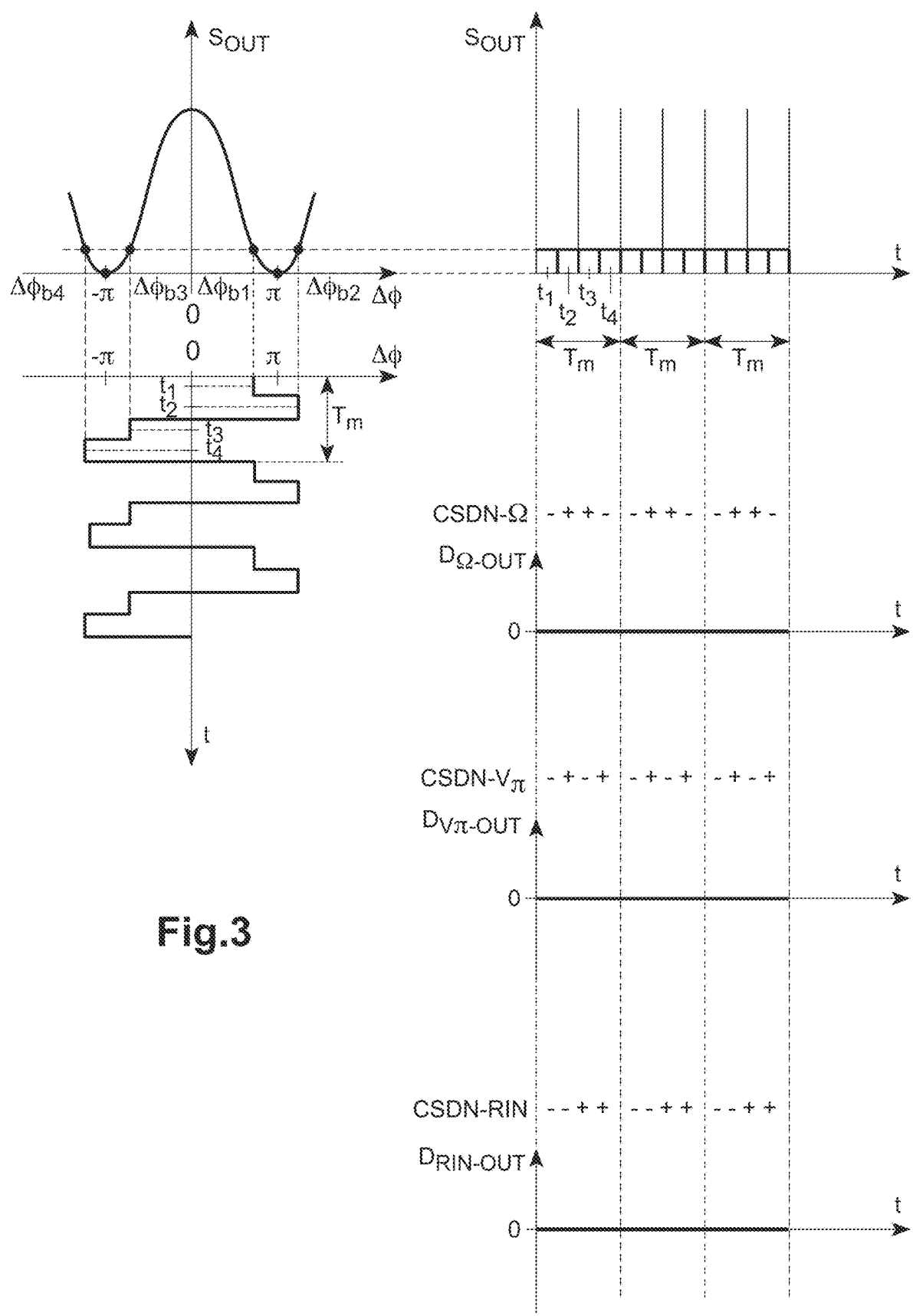
Figure 4:
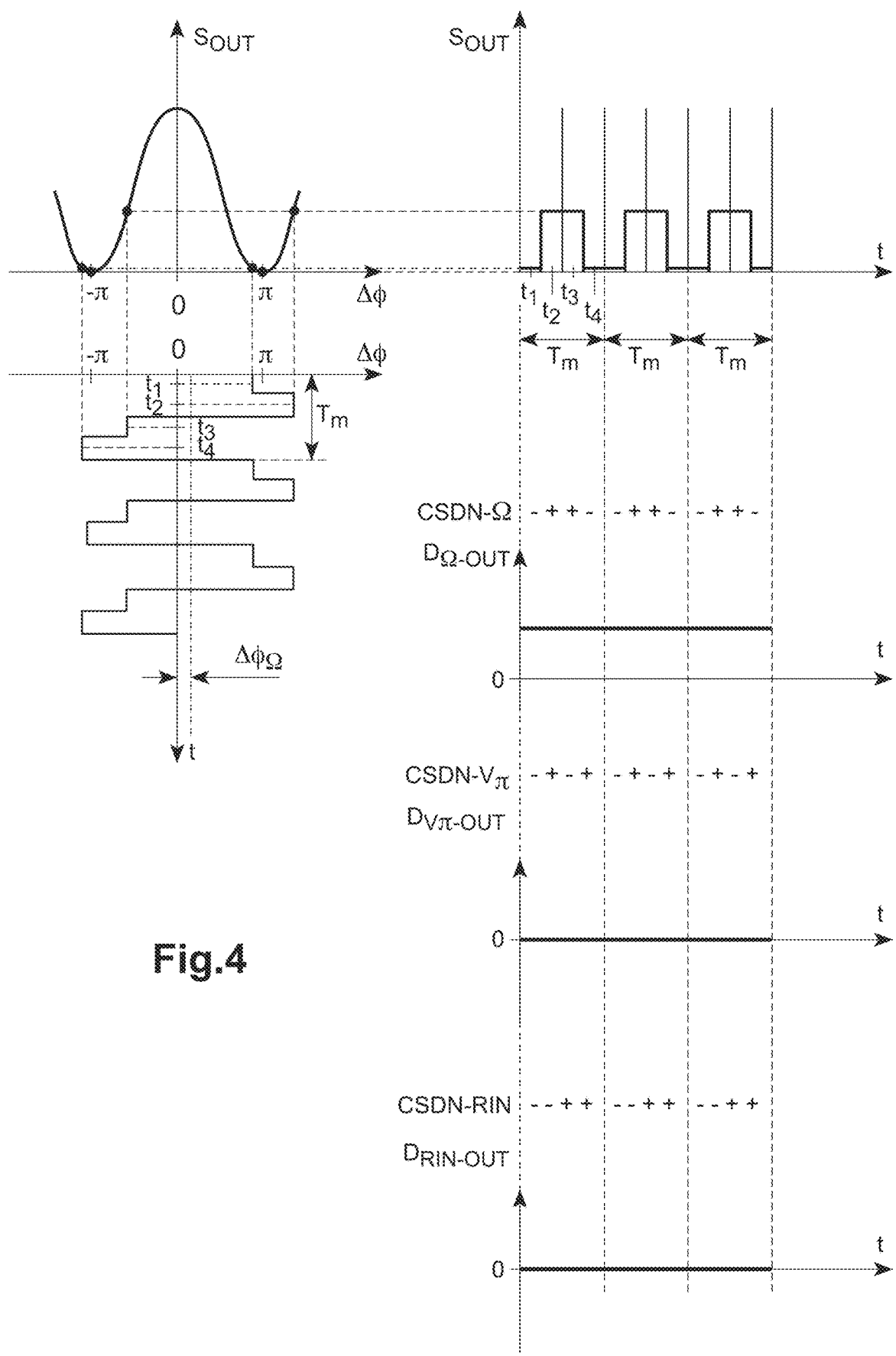
Figure 5:
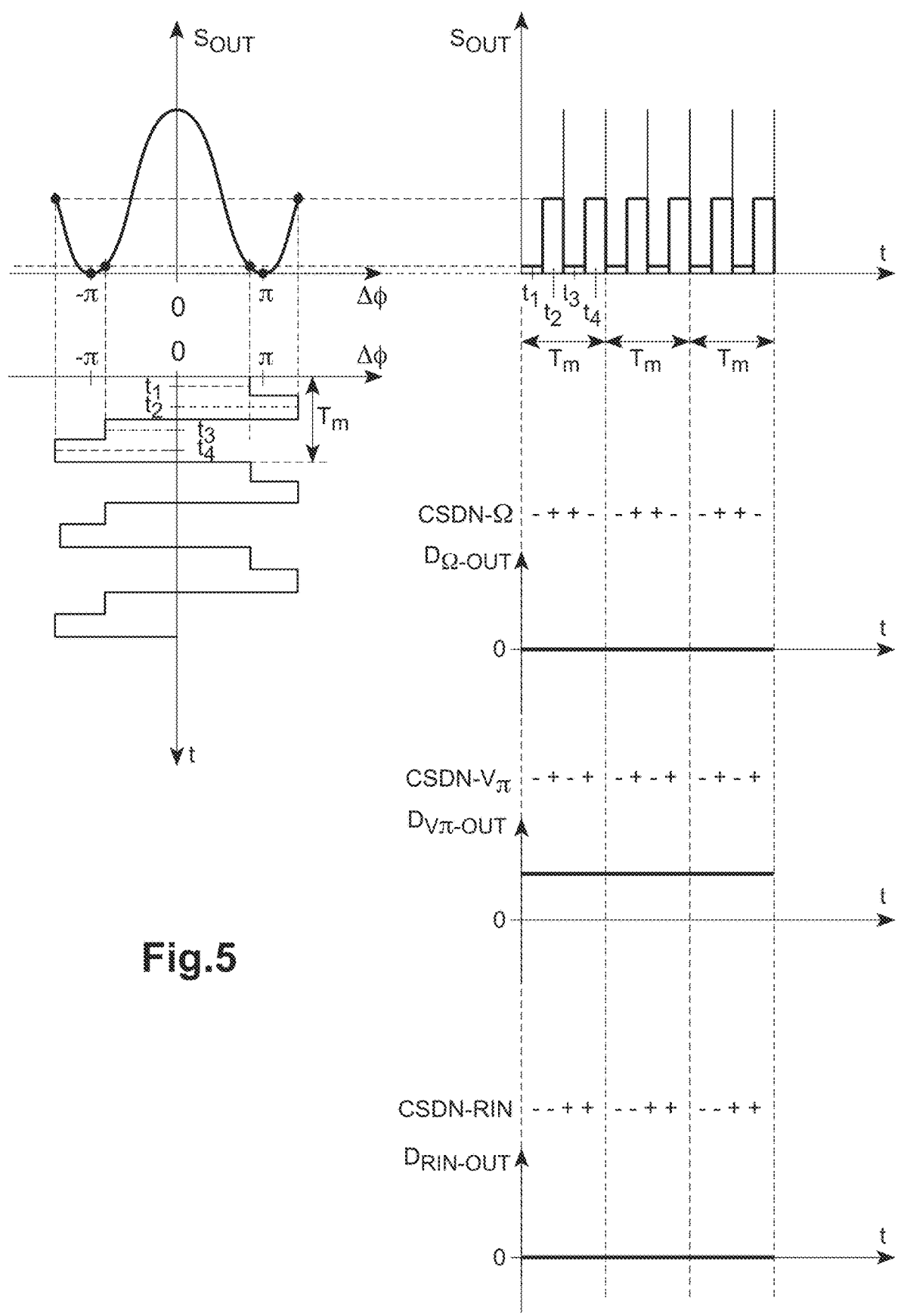
Figure 6:
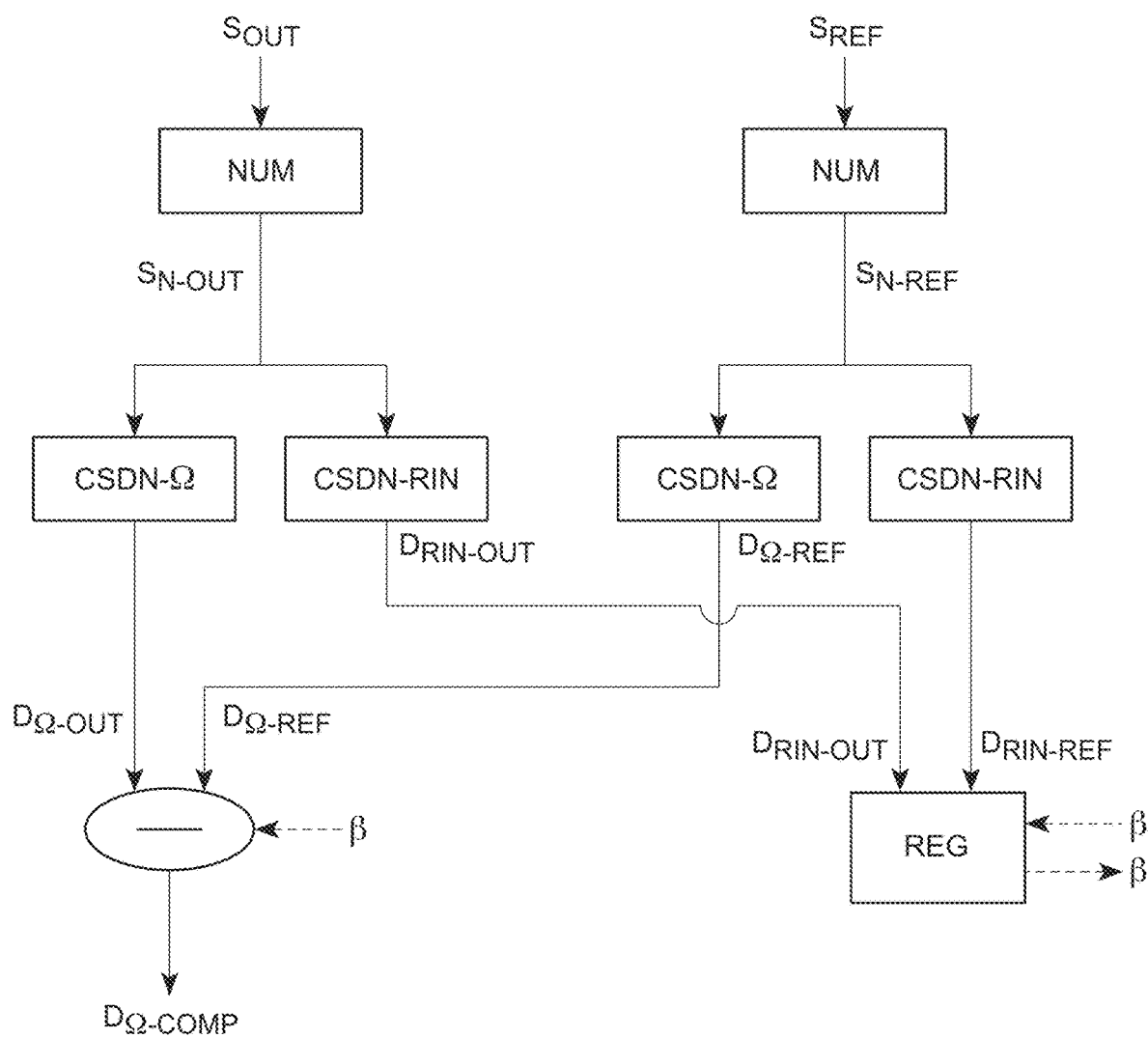
Figure 7:
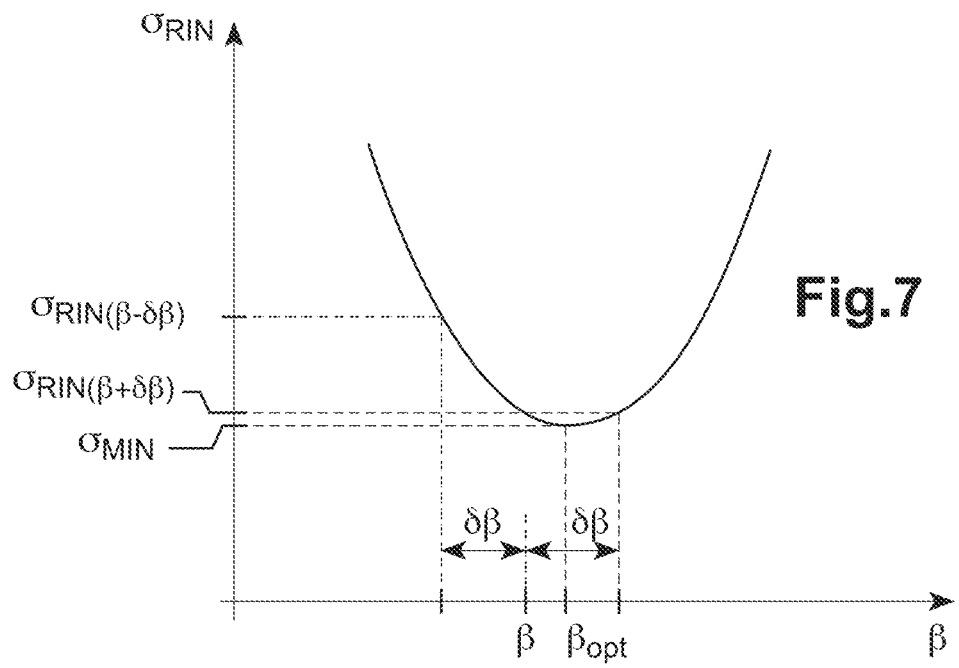
Figure 8:
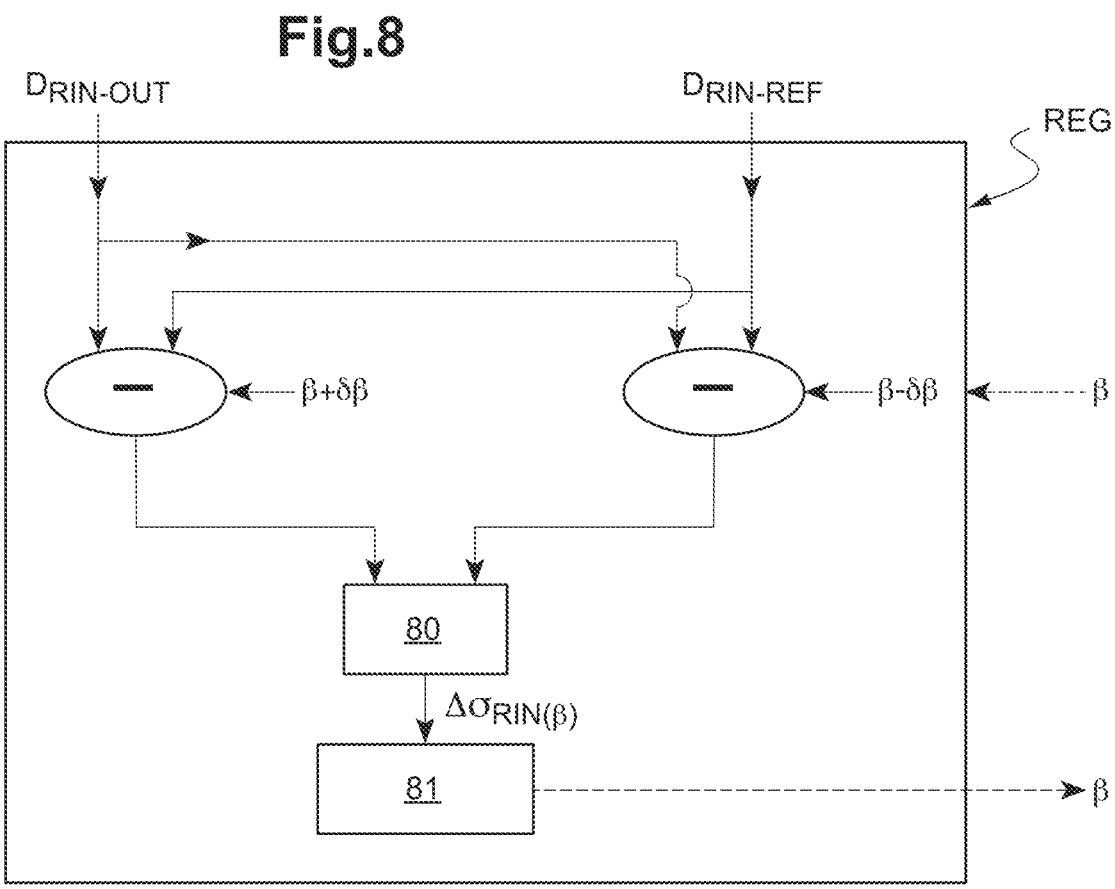

each of FIGS. 3, 4 and 5 schematically shows a signal, measured by means of the measurement system of FIG. 1, or of FIG. 2, as well as signals obtained by processing this measured signal;

FIG. 6 is a block diagram representing the main signal processing operations implemented in the measurement system of FIG. 1, or of FIG. 2, to determine a parameter to be measured;

FIG. 7 schematically shows the statistical deviation of a noisy signal, determined in this measurement system, as a function of a weighting parameter intervening in the signal processing operations of FIG. 6; and FIG. 8 is a block diagram representing in more detail one of the signal processing operations of FIG. 6.

FIGS. 1 and 2 schematically show the main elements of a measurement system 100; 200 according to a first and a second embodiment of the invention. The identical or similar elements of these two embodiments are referenced by the same reference signs and won't be described every time.

This measurement system 100; 200 comprises a spontaneous emission source 110, amplified through stimulated emission (or ASE source), as described in the part relating to the technological background. This light source 110 emits a source light wave $W_S$, that has a source light power $P_S$ affected by an excess relative intensity noise, or RIN, as explained hereinabove.

The measurement system 100; 200 comprises different paths 101, 102, 103, 104 for the propagation of light waves, these paths 101, 102, 103, 104 being herein formed of optical fibre sections, for example silica optical fibres conventionally used in optical telecommunication.

In order to route and guide the different light waves in these different paths 101, 102, 103, 104, the measurement system 100; 200 includes an optical router 120; 220.

The main difference between the first (FIG. 1) and the second (FIG. 2) embodiment of the measurement system lies in the detail of construction of this optical router 120; 220.

Whatever the embodiment, the optical router 120; 220 is optically connected to the light source 110 (by a source path 103), from which it receives the source light wave $W_S$. The optical router 120; 220 is configured to then draw, from the source light wave $W_S$, a reference light wave $W_{REF}$ and an input light wave $W_{IN}$.

The reference light wave $W_{REF}$ is then directed towards an optical radiation detector 142 (called second optical radiation detector), via a reference path 102, whereas the input light wave $W_{IN}$ is directed towards the input-output port of a Sagnac ring interferometer, via an interferometer path 101.

This second optical radiation detector 142 delivers a reference signal $S_{REF}$, proportional to the light power $P_{REF}$ of the reference light wave $W_{REF}$.

The optical router 120; 220 is also configured to receive, from the interferometer path 101, a return wave $W_{BACK}$ exiting from the interferometer 130, and to draw from this return wave $W_{BACK}$ an output light wave $W_{OUT}$.

The output light wave $W_{OUT}$ is then directed towards a first optical radiation detector 141, via an output path 104.

The first optical radiation detector 141 delivers a measurement signal $S_{OUT}$ proportional to the output light power $P_{OUT}$ of the output light wave $W_{OUT}$.

The interferometer 130 of the measurement system 100; 200 is connected by its input-output port to the interferometer path 101, from which it receives the input light wave $W_{IN}$.

The interferometer 130 includes, at its input-output port, a polarizer 131A, followed with a separator-recombiner 131B. The two output paths of the separator-recombiner 131B are respectively connected to the two ends of a fibre coil 132, this fibre being a polarization-maintaining optical fibre.

The input light wave $W_{IN}$, whose polarization is selected by the polarizer 131A, is hence separated by the separator-recombiner 131B into two counter-propagating waves $W_1$ and $W_2$, propagating in opposite directions in the fibre coil 132.

The interferometer 130 further comprises a phase modulator 131C, placed at one of the ends of the fibre coil 132, adapted to introduce a phase difference $\Delta\phi_m$ between the two counter-propagative waves $W_1$ and $W_2$.

Herein, the unit comprising the polarizer 131A, the separator-recombiner 131B and the phase modulator 131C is made by means of a multifunction integrated-optic circuit 131, as described hereinabove in the part relating to the technological background.

After propagation in the fibre coil 132, the two counter-propagating waves $W_1$ and $W_2$ are recombined at the separator-recombiner 131B to produce the return light wave $W_{BACK}$, which exits from the interferometer 130 through its input-output port.

The return light wave $W_{BACK}$ has the same polarization state as the input light wave $W_{IN}$, this polarization state being fixed by the polarizer 131A.

The return light power $P_{BACK}$ of the return light wave $W_{BACK}$ depends on the total phase difference $\Delta\phi$, between these two waves $W_1$ and $W_2$, during the recombination thereof.

As the output power $P_{OUT}$ represents a fraction of the return light power $P_{BACK}$ of the return light wave $W_{BACK}$, the measurement signal $S_{OUT}$ depends, like the return light power $P_{BACK}$, on the total phase difference $\Delta\phi$. A curve schematically representing the measurement signal $S_{OUT}$ as a function of the phase difference $\Delta\phi$ is shown on each of the FIGS. 3 to 5.

This phase difference $\Delta\phi$ is equal to the sum of:
 a phase difference $\Delta\phi_\Omega$ generated by the parameter $\Omega$ to be measured, and
 the phase difference $\Delta\phi_m$ introduced by the phase modulator 131C.

The measurement signal, $S_{OUT}(\Delta\phi)$, thus allows determining the phase difference $\Delta\phi_\Omega$, and deducing therefrom the parameter $\Omega$ to be measured.

Herein, the (physical) parameter $\Omega$ to be measured is the component $\Omega$ of the speed of rotation of the interferometer 130, along an axis of rotation (not shown) parallel to the axis of the fibre coil 132 (the axis of the fibre coil is perpendicular to the plane defined by each turn of the coil).

In the first embodiment of the measurement system 100 according to the invention (FIG. 1), the optical router 120 is made by means of a polarization-maintaining two-by-two fiber coupler with four ports. Preferably, this coupler is a balanced coupler (50-50) transmitting the same light power on each of its output ports.

An additional polarizer 122 is provided on the reference path 102, between the optical router 120 and the second detector 142. This polarizer is arranged so as to select, for the reference light wave $W_{REF}$, the same polarization state as for the input light wave $W_{IN}$ and for the return light wave $W_{BACK}$. The optical fibres forming the paths 101 and 102 are moreover polarization-maintaining optical fibres.

As a variant, instead of the reference path, the additional polarizer mentioned hereinabove could be arranged, for example, on the source path, between the source and the optical router, the source path being then also made by means of a polarization-maintaining optical fibre.

In the second embodiment (FIG. 2), the optical router 220 comprises an optical circulator 221, a polarization-maintaining coupler 224, and an additional polarizer 223.

The circulator 221 comprises three ports, connected as follows in the measurement system:
 a first port 221A is optically connected to the light source 110,
 a second port 221B is optically connected to the input port 224A of the coupler 224, and
 a third port 221C is optically connected to the first detector 141 through the output path 104.

A first output port 224B of the coupler 224 is optically connected to the interferometer 130, through the interferometer path 101, whereas a second output port 224C of the coupler 224 is optically connected to the second detector 142, through the reference path 102.

The additional polarizer 223 is arranged on the light path, between the second port 221B of the circulator 221 and the input port 224A of the coupler. This polarizer 223 is arranged so as to select a polarization state that is identical to the polarization state of the input light wave $W_{IN}$ and of the return light wave $W_{BACK}$. In other words, this additional polarizer 223 is oriented in the same way as the polarizer 131A integrated to the interferometer 130.

In this second embodiment, the optical fibres forming the paths 101 and 102 are, again, polarization-maintaining optical fibres, like the optical fibre(s) connecting the polarizer 223 to the coupler 224.

As a variant, instead of being arranged between the circulator and the coupler, the additional polarizer mentioned above could be arranged, for example, on the source path, between the source and the circulator, the source path being then also made by means of a polarization-maintaining optical fibre.

The circulator 221 receives the source light wave $W_S$ through its first port 221A, and transmits it at its second port 221B. After passage through the additional polarizer 223, this light wave is separated by the coupler 224 between, on the one hand, the input light wave $W_{IN}$, sent towards the interferometer 130 and, on the other hand, the reference light wave $W_{REF}$, sent towards the second detector 142. Preferably, the separation rate of the coupler 224 is of 1% to 5% for the reference wave $W_{REF}$, and hence respectively of 99% to 95% for the input wave $W_{IN}$.

The return light wave $W_{BACK}$, returned by the interferometer 130, enters the coupler through its first output port 224B, and exits therefrom through its input port 224A. It is thereafter transmitted to the circulator 221, which it enters through the second port 221B, and from which it exits through the third port 221C, to then arrive to the first detector 141.

With respect to the optical router implemented in the first embodiment, the optical router 200 of this second embodiment makes it possible, thanks to the optical circulator 221, to collect in the output path 104 a greater proportion of the return light power $P_{BACK}$ exiting from the interferometer, hence improving the accuracy with which the parameter $\Omega$ can be measured.

In the first, as in the second embodiment, as a consequence of the structure of the optical router 120; 220, the output light wave $W_{OUT}$ and the reference light wave $W_{REF}$ have the same polarization state, which herein corresponds to the polarization state of the input $W_{IN}$ and return $W_{BACK}$ light waves, fixed by the integrated polarizer 131A of the interferometer 130.

The measurement $S_{OUT}$ and reference $S_{REF}$ signals, obtained thanks to the just-described optical device, are processed by the digital signal processing unit 150 of the measurement system 100; 200, to determine the parameter $\Omega$ to be measured.

This digital signal processing unit 150 is moreover adapted to pilot the phase modulator 131C so that the latter introduces said phase difference $\Delta\phi_m$ between the counter-propagative waves $W_1$ and $W_2$.

According to a particularly advantageous characteristic of the measurement system 100; 200, the digital signal processing unit 150 is more precisely adapted to control the phase modulator 131C to modulate the phase difference $\Delta\phi_m$ according to a periodic, multi-state, square-wave modulation.

The phase difference $\Delta\phi_m$ is then, over time, constant by portions, and of course periodic.

The corresponding modulation frequency $f_m$ may be equal, as herein to the natural frequency $f_p$ of the interferometer 130. It may also, as a variant, be equal to this natural frequency $f_p$ multiplied by an odd number.

As known, the natural frequency $f_p$ of the interferometer is defined as half the inverse of the time $\tau_B$ of propagation in the coil, $f_p=1/(2\tau_B)$, and hence follows the law coil length multiplied by the natural frequency equals to about 100 km·kHz (hence, for a coil of 1 km of optical fibre, the natural frequency of the interferometer is equal to about 100 kilohertz).

Herein, the modulation period, noted $T_m$, is hence equal to twice the propagation time $\tau_B$ in the fibre coil 132 of the interferometer.

The multi-state square-wave modulation implemented by the digital signal processing unit 150 is herein a "4-state" modulation, as described hereinabove in the summary of the invention.

As a variant, the multi-state square-wave phase modulation introduced by the phase modulator could be the 2-state modulation, or also the so-called "2k+1" modulation mentioned hereinabove.

It is reminded that, for this "4-state" modulation, the phase difference $\Delta\phi_m$ has successively, during each modulation period Tm, 4 constant values $\Delta\phi_{b1}=\pi-\alpha$, $\Delta\phi_{b2}=\pi+\alpha$, $\Delta\phi_{b3}=-\pi+\alpha$ and $\Delta\phi_{b4}=-\pi-\alpha$, the phase-shift $\alpha$ being comprised, for example, between $\pi/64$ and $\pi/2$.

The evolution, over time t, of the total phase difference $\Delta\phi$ obtained at the output of the interferometer, for this "4-state" phase modulation, is illustrated in FIGS. 3 to 5.

The measurement system 100; 200 is then configured to sample and digitize (by means of the two A/D blocks schematically shown in FIGS. 1 and 2), the measurement signal $S_{OUT}(t)$ and the reference signal $S_{REF}(t)$ for each of the four stages corresponding to the four states of the modulation, $\Delta\phi_{b1}$ to $\Delta\phi_{b4}$. It is hence obtained:
  a digitized measurement signal $S_{N-OUT}(t)$ that has four digital values $S_{N-OUT-n}$ (with n=1 to 4) for each of these four modulation states, and
  a digitized reference signal $S_{N-REF}(t)$ that has four digital values $S_{N-REF-n}$ (with n=1 to 4) for each of these four modulation states.

In other words, the measurement signal $S_{OUT}(t)$ is sampled at four successive instants $t_n$ (n=1 to 4) for which $\Delta\phi_m(t_n)=\Delta\phi_{bn}$. A value $S_{N-OUT}(t_n)$ (noted $S_{N-OUT-n}$) being hence obtained for each of these instants $t_n$. The reference signal $S_{REF}$ is sampled in the same way, a value $S_{N-REF}(t_n)$ (noted $S_{N-REF-n}$) being hence obtained at each of these instants.

The biasing of the interferometer 130, obtained thanks to this phase modulation, makes it possible, after demodulation of the digital signal $S_{N-OUT}$, to accede to the phase difference $\Delta\phi_\Omega$ generated by the parameter $\Omega$ to be measured, as will be explained now with reference to FIGS. 3 to 5.

FIG. 3 corresponds to a situation in which the phase difference $\Delta\phi_\Omega$ is null, and in which the "4-state" modulation is performed exactly, i.e. so that:
  the phase differences $\Delta\phi_{b1}$ and $\Delta\phi_{b2}$ are actually symmetrical with respect to a phase-shift of $\pi$, and so that
  the phase differences $\Delta\phi_{b3}$ and $\Delta\phi_{b4}$ are actually symmetrical with respect to a phase shift of $-\pi$.

FIG. 4 corresponds to a situation in which the phase difference $\Delta\phi_\Omega$ is non-null, the "4-state" modulation being again performed exactly.

FIG. 5 corresponds to a situation in which the phase difference $\Delta\phi_\Omega$ is null, but in which the digital-optical conversion gain of the phase modulation chain has a value that is not adapted (herein too high) to obtain an exact "4-state" modulation.

The digital signal processing unit 150 is herein adapted to demodulate the digitized measurement signal $S_{N\text{-}OUT}$ by applying thereto a first sequential digital demodulation code, noted CSDN-$\Omega$, or also $-++-$, which consists in summing the four values $S_{N\text{-}OUT\text{-}1}$, $S_{N\text{-}OUT\text{-}2}$, $S_{N\text{-}OUT\text{-}3}$, $S_{N\text{-}OUT\text{-}4}$, by having previously respectively multiplied them by $-1$, $+1$, $+1$, $-1$:

$$\text{CSDN-}\Omega(S_{N\text{-}OUT}(t)) = -S_{N\text{-}OUT\text{-}1} + S_{N\text{-}OUT\text{-}2} + S_{N\text{-}OUT\text{-}3} - S_{N\text{-}OUT\text{-}4}.$$

This demodulated signal depends of the parameter $\Omega$ to be measured, also called first parameter $\Omega$ hereinafter. This signal is noted $D_{\Omega\text{-}OUT}(t)$, for digital demodulation of the digitized measurement signal $S_{N\text{-}OUT}(t)$ according to the code CSDN-$\Omega$ sensitive to the first parameter $\Omega$ to be measured, and hence:

$$D_{\Omega\text{-}OUT}(t) = \text{CSDN-}\Omega(S_{N\text{-}OUT}(t)) = -S_{N\text{-}OUT\text{-}1} + S_{N\text{-}OUT\text{-}2} + S_{N\text{-}OUT\text{-}3} - S_{N\text{-}OUT\text{-}4}.$$

The dependence of the first demodulated measured signal $D_{\Omega\text{-}OUT}(t)$ with the first parameter $\Omega$ is illustrated in FIGS. 3 to 5: FIGS. 3 and 5 show that this demodulated signal is null when the phase difference $\Delta\phi_\Omega$ is null, whereas, in the case of a non-null phase difference $\Delta\phi_\Omega$, as in FIG. 4, this demodulated signal is also non-null (and all the higher since this phase difference $\Delta\phi_\Omega$ is great).

This 4-state modulation also makes it possible to generate a measurement signal of a second parameter, or additional parameter, noted $V_\pi$ representative of the digital-optical conversion gain of the phase modulation chain, from a second sequential digital demodulation code, noted CSDN-$V_\pi$, or also $-+-+$. This demodulated signal, called $V_\pi$-signal, depending on the second parameter $V_\pi$ to be measured, is noted $D_{V_\pi\text{-}OUT}(t)$ for a digital demodulation according to the code sensitive to the second parameter $V_\pi$ to be measured, and hence:

$$D_{V_\pi\text{-}OUT}(t) = \text{CSDN-}V_\pi(S_{N\text{-}OUT}(t)) = -S_{N\text{-}OUT\text{-}1} + S_{N\text{-}OUT\text{-}2} - S_{N\text{-}OUT\text{-}3} + S_{N\text{-}OUT\text{-}4}.$$

The first sequential digital demodulation code CSDN-$\Omega$ ($-++-$), that provides the first parameter $\Omega$ to be measured, is insensitive to this second parameter $V_\pi$ to be measured. In other words, a signal obtained by applying the first sequential digital demodulation code CSDN-$\Omega$ is independent of the value of the second parameter $V_\pi$. By way of example, the signal $D_{\Omega\text{-}OUT}(t)$ obtained in the situation of FIG. 3 is identical to that obtained in the situation of FIG. 5 (it is herein a null signal), whereas these two situations correspond to different values of the parameter $V_\pi$. This illustrates the insensitivity of the first sequential digital demodulation code CSDN-$\Omega$ to the second parameter $V_\pi$.

Similarly, the second sequential digital demodulation code CSDN-$V_\pi$ ($-+-+$), giving the second parameter $V_\pi$ to be measured, is insensitive to the first parameter $\Omega$ to be measured (as observed by comparing FIGS. 3 and 4).

The 4-state modulation hence allows having access independently to two parameters to be measured, $\Omega$ and $V_\pi$, using the same chain of detection, amplification, filtering and digitization of the output power $P_{OUT}$, to produce a digitized measurement signal, $S_{N\text{-}OUT}(t)$, which is then simply processed with two different sequential digital demodulation codes, CSDN-$\Omega$ and CSDN-$V_\pi$, which are each, respectively, sensitive to their parameter to be measured, $\Omega$ or $V_\pi$, and insensitive to the other parameter to be measured, $V_\pi$ or $\Omega$. It will be noted that the signals produced by these two sequential digital demodulation codes CSDN-$\Omega$ and CSDN-$V_\pi$ are affected by the RIN.

As indicated hereinabove, in a variant of the measurement system according to the invention, the digital signal processing unit is adapted to control the phase modulator so that it applies a so-called "2k+1" phase modulation, instead of a "4-state" phase modulation. For this "2k+1" modulation, two different sequential digital demodulation codes, respectively, sensitive to their parameter to be measured, $\Omega$ or $V_\pi$, and insensitive to the other parameter to be measured, $V_\pi$ or $\Omega$, may also be implemented, as described in U.S. Pat. No. 9,291,458.

The measurement signal $S_{OUT}$ makes it possible, taking into account the demodulation operations described hereinabove, to determine the first and second parameters $\Omega$ and $V_\pi$.

The reference signal $S_{REF}$ can be used, as explained in the part relating to the technological background, to compensate for fluctuations of the measurement signal $S_{OUT}$ caused by the RIN.

For that purpose, the digital signal processing unit 150 is herein adapted to:

apply to the digitized reference signal $S_{N\text{-}REF}(t)$ the first sequential digital demodulation code CSDN-$\Omega$, to obtain a first demodulated reference signal $D_{\Omega\text{-}REF}$, then to determine a first compensated measurement signal $D_{\Omega\text{-}COMP}(t)$, by calculating a weighted difference between the first demodulated measurement signal $D_{\Omega\text{-}OUT}$ and the first demodulated reference signal $D_{\Omega\text{-}REF}$, a weighting coefficient $\beta$ being applied to the first demodulated reference signal $D_{\Omega\text{-}REF}$: $D_{\Omega\text{-}COMP} = D_{\Omega\text{-}OUT} - \beta \cdot D_{\Omega\text{-}REF}$.

The digital signal processing unit 150 is herein further adapted to:

apply to the digitized reference signal $S_{N\text{-}REF}$ the second sequential digital demodulation code CSDN-$V_\pi$, to obtain a second demodulated reference signal $D_{V_\pi\text{-}REF}$, then to determine a second compensated measurement signal $D_{V_\pi\text{-}COMP}$, by calculating a weighted difference between the second demodulated measurement signal $D_{V_\pi\text{-}OUT}$ and the second demodulated reference signal $D_{V_\pi\text{-}REF}$, the same weighting coefficient $\beta$ being applied to the second demodulated reference signal $D_{V_\pi\text{-}REF}$: $D_{V_\pi\text{-}COMP} = D_{V_\pi\text{-}OUT} - \beta \cdot D_{V_\pi\text{-}REF}$, so as to also compensate for the influence of the RIN on the measurement of the second parameter $V_\pi$.

In a particularly remarkable way, the digital signal processing unit 150 is adapted to determine a third compensated signal $D_{RIN\text{-}COMP}$ by:

applying a third sequential digital demodulation code CSND-RIN, insensitive to the first parameter to be measured and sensitive to the excess relative intensity noise (or RIN), to the digitized measurement signal $S_{N\text{-}OUT}$, to produce a third demodulated measurement signal $D_{RIN\text{-}OUT}$, sensitive to only the RIN, and to the digitized reference signal $S_{N\text{-}REF}$, to produce a third demodulated reference signal $D_{RIN\text{-}REF}$, sensitive only to the RIN, then calculating a weighted difference between the third demodulated measurement signal $D_{RIN-OUT}$ and the third demodulated reference signal $D_{RIN-REF}$, the third demodulated reference signal $D_{RIN-REF}$ being multiplied by the same weighting coefficient β than that which is used to compensate for the influence of the RIN on the first demodulated measurement signal $D_{\Omega\text{-}COMP}$.

The digital signal processing unit 150 is further adapted to control said weighting coefficient β to an optimum value $β_{opt}$ that minimizes or reduces below a given threshold, herein minimizes, the statistical deviation $σ_{RIN}$ of the third compensated signal $D_{RIN-COMP}$.

The weighting coefficient β is hence controlled to said value $β_{opt}$, for which the RIN is optimally compensated for the third compensated signal $D_{RIN-COMP}$, but also for the first compensated measurement signal $D_{\Omega\text{-}COMP}$, hence best reducing the influence of the RIN on the measurement of the first parameter Ω. The RIN is also optimally compensated for the second compensated measurement signal $D_{Vπ\text{-}COMP}$, hence best reducing the influence of the RIN on the measurement of the second parameter $V_π$.

The additional sequential digital demodulation code CSDN-RIN (or third sequential digital demodulation code) is herein more precisely insensitive both to the first parameter Ω and to the second parameter $V_π$ to be measured. This additional code CSDN-RIN will hence be sensitive only to the RIN and will allow the control of its compensation without being impaired by the two parameters to be measured, Ω and $V_π$.

In the case of the "4-state" modulation implemented herein, two examples of such a digital demodulation code CSDN-RIN may in particular be given: a first sequence + + − − (or − − + +), or a second sequence + + + + − − − − (or − − − − + + + +) that then extends over 8 successive states and hence 2 periods $T_m$ of the 4-state modulation.

In the case of the sequence + + − −, for example, the third demodulated measurement signal $D_{RIN-OUT}(t)$ sensitive only to the RIN, is obtained in accordance to the following formula:

$$D_{RIN-OUT}(t)=\text{CSDN-RIN}(S_{N-OUT}(t))=+S_{N-OUT-1}+S_{N-OUT-2}-S_{N-OUT-3}-S_{N-OUT-4},$$

and, likewise:

$$D_{RIN-REF}(t)=\text{CSDN-RIN}(S_{N-REF}(t))=+S_{N-REF-1}+S_{N-REF-2}-S_{N-REF-3}-S_{N-REF-4}.$$

FIGS. 3 to 5 illustrate, in the case of this sequence + + − −, the insensitivity of the additional sequential digital demodulation code CSDN-RIN with respect to the first and second parameters Ω and $V_π$. It is indeed observed, by comparing the FIGS. 3 and 4, that the third demodulated measurement signal $D_{RIN-OUT}(t)$ is identical (herein null) in the situations corresponding to these two figures, whereas they correspond to two different values of the first parameter Ω. Likewise, it is observed, by comparing FIGS. 3 and 5, that the third demodulated measurement signal $D_{RIN-OUT}(t)$ does not depend on the second parameter $V_π$.

As indicated hereinabove, the phase difference $Δϕ_m$ could, as a variant, be modulated according to a 2-state modulation, and not according to this "4-state" modulation. Within the framework of this variant, the first sequential digital demodulation code CSDN-Ω is then made according to the sequence − +, over a period, and hence − + − + over two modulation periods. The additional sequential digital demodulation code CSDN-RIN is then made according to the sequence + + − − or − − + +, over two modulation periods (it will be noted that it is actually insensible to the parameter Ω to be measured).

To efficiently compensate for the RIN, the measurement signal must be resynchronized with the reference signal before calculating said weighted differences, as explained in the part relating to the technological back-ground. For that purpose, the compensated signals are determined in accordance to the following formulas:

$$D_{\Omega\text{-}COMP}(t)=D_{\Omega\text{-}OUT}(t)-β·D_{\Omega\text{-}REF}(t-τ),$$

$$D_{Vπ\text{-}COMP}(t)=D_{Vπ\text{-}OUT}(t)-β·D_{Vπ\text{-}REF}(t-τ),\ \text{and}$$

$$D_{RIN\text{-}COMP}(t)=D_{RIN\text{-}OUT}(t)-β·D_{RIN\text{-}REF}(t-τ),$$

where τ is the delay between the measurement signal and the reference signal, caused in particular by the transit time of the interferometer.

In order for this resynchronization to be made simply, without specific optical or electronic delay line, the optical part of the measurement system is herein configured so as to equalize:

the delay τ between the measurement signal and the reference signal, with the time $τ_B$ of propagation in the coil, which defines the multi-state modulation period $T_m$, herein equal to 2 $τ_B$.

This is done by equalizing:

the optical path between the light source 110 and the second detector 142 on one side, with, on the other side, the sum of the optical path between the light source 110 and the input-output port of the interferometer 130, and of the optical path between this input-output port and the first detector 141.

The resynchronization of the measurement and reference signals is then made, in an advantageously simple manner, by shifting the sequences of the digital demodulation codes, when they are applied to the reference signal, by the number of states corresponding to the time $τ_B$ of propagation in the coil and hence, by the number of states corresponding to half the modulation period $T_m$ of the multi-state square-wave modulation.

In the example of the 4-state modulation, this offset is of two states, the time $τ_B$ of propagation in the coil being twice the duration of a state. The demodulation of the measurement signal, according to the first digital demodulation code CSDN-Ω, for example, is then performed in accordance to the following formula:

$$D_{\Omega\text{-}OUT}(t)=S_{N-OUT}(t_{k+1})+S_{N-OUT}(t_{k+2})+S_{N-OUT}(t_{k+3})-S_{N-OUT}(t_{k+4}),$$

whereas the demodulation of the reference signal by this code CSDN-Ω is then performed in accordance to the following formula:

$$D_{\Omega\text{-}REF}(t-τ)=D_{\Omega\text{-}REF}(t-τ_B)=\text{CSDN-}\Omega\left(S_{N-REF}(t-τ_B)\right)$$
$$=-S_{N-REF}(t_{k-1})+S_{N-REF}(t_k)+S_{N-REF-3}(t_{k+1})-S_{N-REF}(t_{k+2})$$

where $t_{k+n}$, n=1 to 4, is the instant of the $k^{th}$ modulation period for which $Δϕ_m(t_{k+n})=Δϕ_{bn}$ (in other words, this instant $t_{k+n}$ corresponds, in the $k^{th}$ modulation period, to the modulation state n).

The same shifting rule is applied herein to produce the demodulated and resynchronized reference signals $D_{Vπ\text{-}REF}(t-τ)$ and $D_{RIN\text{-}REF}(t-τ)$.

In the case of some multi-state square-wave modulation or other, the demodulated reference signals $D_{\Omega\text{-}REF}$ and $D_{RIN\text{-}REF}$ (as well as $D_{V\pi\text{-}REF}$) are resynchronized by replacing, in the digital demodulation calculations, the sequence of values $S_{N\text{-}REF}(t_{k+n})$, n=1 to 2m, n being the order number of the modulation state in the period, and 2m being the number of modulation states, by the sequence of values $S_{N\text{-}REF}(t_{k+n-m})$. By way of example, the 2-state modulation corresponds to m=1, whereas the "4-state" modulation corresponds to m=2.

The signal processing operations implemented by the measurement system according to the invention will now be summarized, with reference to FIG. 6.

These processing operations begin by the digitization of the (analog) measurement $S_{OUT}$ and reference $S_{REF}$ signals, already mentioned hereinabove (block NUM in FIG. 6). This digitization is preceded by an amplification and a frequency filtering respecting the Shannon criterion of this digitization. Herein, this frequency filtering further eliminates the direct component of the measurement $S_{OUT}$ and reference signals $S_{REF}$.

The first, second and third sequential digital demodulation codes are then applied to the digitized measurement and reference signals $S_{N\text{-}OUT}$ and $S_{N\text{-}REF}$, hence producing:

the first demodulated measurement and reference signals $D_{\Omega\text{-}OUT}$ and $D_{\Omega\text{-}REF}$, the second demodulated measurement and reference signals $D_{V\pi\text{-}OUT}$ and $D_{V\pi\text{-}REF}$, and the third demodulated measurement and reference signals $D_{RIN\text{-}OUT}$ and $D_{RIN\text{-}REF}$.

These demodulations are herein performed so at to resynchronise the demodulated reference signals, with the demodulated measurement signals, as explained hereinabove.

The first compensated measurement signal $D_{\Omega\text{-}COMP}$ is then determined by calculating the weighted difference of the first demodulated measurement and reference signals $D_{\Omega\text{-}OUT}$ and $D_{\Omega\text{-}REF}$ (the first demodulated reference signal $D_{\Omega\text{-}REF}$ being multiplied by the weighting coefficient $\beta$).

A value of the first parameter $\Omega$ is then determined based on this measurement signal $D_{\Omega\text{-}COMP}$, compensated for the RIN.

The second compensated measurement signal $D_{V\pi\text{-}COMP}$ is moreover determined by calculating the weighted difference of the second demodulated measurement and reference signals $D_{V\pi\text{-}OUT}$ and $D_{V\pi\text{-}REF}$ (the second demodulated reference signal $D_{V\pi\text{-}REF}$ being multiplied by the same weighting coefficient $\beta$).

A value of the second parameter $V_\pi$ is then determined, based on this measurement signal $D_{V\pi\text{-}COMP}$, compensated for the RIN.

The third demodulated measurement and reference signals, $D_{RIN\text{-}OUT}(t)$ and $D_{RIN\text{-}REF}(t)$, are for their part used to control said same weighting coefficient $\beta$ to its optimum value $\beta_{opt}$. This control, that will now be described in more detail, is schematically represented by the block REG in FIG. 6 (described in more detail in FIG. 8).

It is reminded that the optimum value $\beta_{opt}$ of the weighting coefficient $\beta$ minimizes the statistical deviation $\sigma_{RIN}$ of the third compensated signal $D_{RIN\text{-}COMP}$ (also called additional compensated signal), that depends on the weighting coefficient $\beta$, as schematically shown in FIG. 7.

Indeed, if $\beta$ is too small, there will be a residue of dependence to the RIN due to the under-compensation for the RIN of $D_{RIN\text{-}OUT}(t)$ the absolute intensity noise of the product $\beta \cdot D_{RIN\text{-}REF}(t-\tau)$ being then too small with respect to that of $D_{RIN\text{-}OUT}(t)$.

It will be the same if $\beta$ is too high, due to the over-compensation brought by the absolute intensity noise of $\beta \cdot D_{RIN\text{-}REF}(t-\tau)$ which is then too high with respect to that of $D_{RIN\text{-}OUT}(t)$.

When the value of $\beta$ is equal to its optimum value $\beta_{opt}$, the influence of the RIN on the signal $D_{RIN\text{-}OUT}(t)$ is on the other hand totally eliminated (the absolute intensity noises of the signals $\beta \cdot D_{RIN\text{-}REF}(t-\tau)$ and $D_{RIN\text{-}OUT}(t)$ being balanced), and the statistical deviation $\sigma_{RIN}$ of this signal then reaches the theoretical minimum $\sigma_{MIN}$ given by the photon noise.

To determine the statistical deviation $\sigma_{RIN}$, the digital signal processing unit 150 is more precisely adapted herein to calculate a mean of the absolute value of the difference $D_{RIN\text{-}COMP} - \langle D_{RIN\text{-}COMP} \rangle$ between the additional compensated signal $D_{RIN\text{-}COMP}$ and its mean value $\langle D_{RIN\text{-}COMP} \rangle$:

$$\sigma_{RIN} = \langle |D_{RIN\text{-}COMP} - \langle D_{RIN\text{-}COMP} \rangle| \rangle.$$

As the mean value of the signals $D_{RIN\text{-}OUT}$ and $D_{RIN\text{-}REF}$ is null, the mean value $\langle D_{RIN\text{-}COMP} \rangle$ is also null, so that the statistical deviation $\sigma_{RIN}$ is herein calculated simply as the mean value of the absolute value $|D_{RIN\text{-}COMP}|$:

$$\sigma_{RIN} = \langle |D_{RIN\text{-}COMP}| \rangle.$$

As a variant, the statistical deviation $\sigma_{RIN}$ of the third compensated signal $D_{RIN\text{-}COMP}$ could be determined by calculating the standard deviation, or also the variance of this signal, instead of calculating the mean value of its absolute value.

Herein, the control of the weighting coefficient $\beta$ to its optimum value $\beta_{opt}$ is made by:

calculating a difference $\Delta\sigma_{RIN}(\beta)$ between a first value of the statistical deviation $\sigma_{RIN}(\beta+\delta\beta)$ of the third compensated signal $D_{RIN\text{-}COMP}$ calculated for a first offset value $\beta+\delta\beta$ of the weighting coefficient $\beta$, and a second value of the statistical deviation $\sigma_{RIN}(\beta-\delta\beta)$ of the third compensated signal $D_{RIN\text{-}COMP}$ calculated for a first offset value $\beta-\delta\beta$ of the weighting coefficient $\beta$, and by controlling the weighting coefficient $\beta$ so as to nullify this difference $\Delta\sigma_{RIN}(\beta)$.

As the statistical deviation $\sigma_{RIN}$ of the third compensated signal $D_{RIN\text{-}COMP}$ is minimum for said optimum value $\beta_{opt}$ (see FIG. 7), the difference $\Delta\sigma_{RIN}(\beta)$ is nullified for $\beta=\beta_{opt}$. Thus, controlling the weighting coefficient $\beta$ so as to nullify the difference $\Delta\sigma_{RIN}(\beta)$ efficiently causes the weighting coefficient $\beta$ to reach its optimum value $\beta_{opt}$.

Herein, the control unit is more precisely programmed to calculate the difference $\Delta\sigma_{RIN}(\beta) = \sigma_{RIN}(\beta+\delta\beta) - \sigma_{RIN}(\beta-\delta\beta)$ by summing over time the difference of the absolute values $|D_{RIN\text{-}COMP}(\beta+\delta\beta)| - |D_{RIN\text{-}COMP}(\beta-\delta\beta)|$:

$$\Delta\sigma_{RIN}(\beta) = \Sigma_k |D_{RIN\text{-}COMP}(\beta+\delta\beta)| - |D_{RIN\text{-}COMP}(\beta-\delta\beta)|$$

where the sum $\Sigma_k$ denotes a sum of several modulation periods.

The calculation of the difference $\Delta\sigma_{RIN}(\beta)$ corresponds, in FIG. 8, to the block 80.

The difference $\Delta\sigma_{RIN}(\beta)$ is then used as an error signal to control the weighting coefficient $\beta$, by means herein of an iterative proportional correction of the form:

$$\beta(i+1) = \beta(i) - \gamma \cdot \Delta\sigma_{RIN}(\beta(i))$$

where $\gamma$ is the counter-reaction coefficient of the control loop.

It will be noted that this iterative proportional correction (corresponding, in FIG. 8, to the block 81) naturally leads to a correction of the integral type, without requiring an additional processing, due to the fact that the error signal $\Delta\sigma_{RIN}$ is produced herein by accumulation over time of the differences $|D_{RIN\text{-}COMP}(\beta(i)+\delta\beta)|-|D_{RIN\text{-}COMP}(\beta(i)-\delta\beta)|$.

The digital signal processing unit 150 is herein further adapted to control the phase modulator 131C so as to apply between the two counter-propagating waves $W_1$, $W_2$, a counter-reaction phase shift, function of the measurement signal $S_{OUT}$, so as to compensate for the non-reciprocal phase-shift $\Delta\phi_\Omega$ between these two waves $W_1$, $W_2$ depending on the first parameter $\Omega$ to be measured. In other words, the measurement system 100; 200 is adapted to measure the parameter $\Omega$ in closed loop.

The measurement system 100; 200 according to the invention may be a part of the making of a fibre-optic gyroscope, which can itself be a part of an inertial attitude and navigation unit.

The physical parameter $\Omega$ to be measured then corresponds, as indicated hereinabove, to the component of the speed of rotation of the gyroscope parallel to the axis of the fibre coil.

As a variant, the measurement system may belong to a current or magnetic field sensor. In this case, the physical parameter to be measured is an electrical current or a magnetic field, which, by FARADAY effect induces a variation of the non-reciprocal phase difference between the two counter-propagating light waves propagating in the fibre coil.

The invention claimed is:

1. A system for measuring a parameter including:
    an amplified spontaneous emission light source, emitting a source light wave having a source light power that is impaired by an excess relative intensity noise,
    an optical router configured to:
        draw an input light wave from said source light wave, this input light wave being directed towards a Sagnac ring interferometer including a polarizer, a separator-recombiner, a phase modulator and a polarization-maintaining fibre coil, the interferometer receiving, as an input, said input light wave whose polarization state is selected by the polarizer, and producing, as an output, a return light wave according to the same polarization state as the input light wave, the return light wave having a return light power that depends on the parameter to be measured and function of a phase difference $\Delta\Phi_m$ between two counter-propagating waves propagating in the interferometer, introduced by the phase modulator,
        draw, from said return light wave, an output light wave, this output light wave being directed towards a first optical radiation detector that delivers a measurement signal representative of an output power of the output light wave, and to
        draw a reference light wave from said source light wave, this reference light wave having the same polarization state as the input light wave and as the return light wave, and being directed towards a second optical radiation detector that delivers a reference signal representative of a reference power of the reference light wave, and
    a digital signal processing unit adapted to process the measurement and reference signals to provide a measurement of said parameter from a compensated measurement signal that is determined by calculation of a weighted difference between:
        a first signal that is a function of the measurement signal, and
        a second signal that is a function of the reference signal, the reference signal being resynchronized with the measurement signal, a weighting coefficient being applied to this second signal,
    wherein the signal processing unit is adapted to:
    control the phase modulator to modulate the phase difference $\Delta\Phi_m$ according to a multi-state square-wave periodic modulation,
    determine the compensated measurement signal by further applying a first sequential digital demodulation code, sensitive to said parameter to be measured,
    determine an additional compensated signal:
        by calculating a weighted difference between a first additional signal, that is a function of the measurement signal, and a second additional signal, that is a function of the reference signal, the reference signal being resynchronized with the measurement signal, the same weighting coefficient, applied to said second signal, being applied to the second additional signal,
        and by applying an additional sequential digital demodulation code, insensitive to said parameter to be measured,
    and control said weighting coefficient to an optimum value that minimizes a statistical deviation $\sigma_{RIN}$ of the additional compensated signal or that reduces said statistical deviation $\sigma_{RIN}$ below a given threshold.

2. The measurement system according to claim 1, wherein:
    the output power of the output light wave further depends on an additional parameter,
    the digital signal processing unit is further adapted to determine said additional parameter, based on a demodulated measurement signal produced by applying to the measurement signal a second sequential digital demodulation code, insensitive to the parameter to be measured and sensitive to said additional parameter, and wherein
    the additional sequential digital demodulation code is moreover insensitive to said additional parameter.

3. The measurement system according to claim 2, wherein:
    the phase difference $\Delta\Phi_m$ has successively, during each modulation period, four constant values $\Delta\Phi_{b1}=\pi-\alpha$, $\Delta\Phi_{b2}=\pi+\alpha$, $\Delta\Phi_{b3}=-\pi+\alpha$ and $\Delta\Phi_{b4}=-\pi-\alpha$, $\alpha$ being a phase-shift lower than $\pi/2$,
    in response to each of the four phase difference values $\Delta\Phi_{b1}$, $\Delta\Phi_{b2}$, $\Delta\Phi_{b3}$, $\Delta\Phi_{b4}$, a signal to be processed has four values $x_1$, $x_2$, $x_3$, $x_4$ respectively, the application of the first sequential digital demodulation code to the signal to be processed consisting in summing the four values $x_1$, $x_2$, $x_3$, $x_4$ the four values $x_1$, $x_2$, $x_3$, $x_4$ having been multiplied, prior to this summation, by $-1$, $+1$, $+1$, $-1$ respectively, or by $+1$, $-1$, $-1$, $+1$ respectively, and wherein
    the application of the second sequential digital demodulation code to the signal to be processed consists in summing the four values $x_1$, $x_2$, $x_3$, $x_4$, the four values $x_1$, $x_2$, $x_3$, $x_4$ having previously been multiplied by $-1$, $+1$, $-1$, $+1$ respectively, or by $+1$, $-1$, $+1$, $-1$ respectively.

4. The measurement system according to claim 1, wherein the two demodulations performed by the first sequential digital demodulation code and by the second sequential digital demodulation code, respectively, are in quadrature with respect to each other.

5. The measurement system according to claim 1, wherein the additional sequential digital demodulation code is sensitive to a periodic component having a frequency equal to the modulation frequency divided by an even number.

6. The measurement system according to claim 3, wherein the application of the additional sequential digital demodulation code consists in summing the four values $x_1$, $x_2$, $x_3$, $x_4$, the four values $x_1$, $x_2$, $x_3$, $x_4$ having been previously multiplied by +1, +1, −1, −1 respectively, or by −1, −1, +1, +1 respectively.

7. The measurement system according to claim 3, wherein the application of the additional sequential digital demodulation code consists in summing the four values $x_1$, $x_2$, $x_3$, $x_4$ the signal to be processed has during a modulation period, and in subtracting from them the sum of the four values $x_1$, $x_2$, $x_3$, $x_4$ the signal to be processed has during the following modulation period.

8. The measurement system according to claim 1, wherein the application of the additional sequential digital demodulation code to a signal consists in applying to this signal at least one mathematical operation, except for a Fourier transform.

9. The measurement system according to claim 1, wherein the digital signal processing unit is adapted to determine the statistical deviation $\sigma_{RIN}$ of the additional compensated signal $D_{RIN\text{-}COMP}$ by calculating a mean of the absolute value of the difference $D_{RIN\text{-}COMP} - \langle D_{RIN\text{-}COMP} \rangle$ between the additional compensated signal $D_{RIN\text{-}COMP}$ and its mean value $\langle D_{RIN\text{-}COMP} \rangle$.

10. The measurement system according to claim 1, wherein the control of the weighting coefficient $\beta$ to said optimum value is performed by:

calculating a difference $\Delta\sigma_{RIN}(\beta)$ between:
  a first value of the statistical deviation $\sigma_{RIN}(\beta+\delta\beta)$ of the additional compensated signal $D_{RIN\text{-}COMP}$ calculated for a first offset value $\beta+\delta\beta$ of the weighting coefficient $\beta$, and
  a second value of the statistical deviation $\sigma_{RIN}(\beta-\delta\beta)$ of the additional compensated signal $D_{RIN\text{-}COMP}$, calculated for a second offset value $\beta-\delta\beta$ of the weighting coefficient $\beta$, and by
controlling the weighting coefficient $\beta$ so as to nullify this difference $\Delta\sigma_{RIN}(\beta)$.

11. The measurement system according to claim 1, adapted to apply a counter-reaction phase-shift between the two counter-propagative waves propagating in the interferometer, by means of said phase modulator, depending on the measurement signal, so as to compensate for a non-reciprocal phase-shift between the two counter-propagative waves that depends on the parameter to be measured.

12. A gyroscope including a measurement system according to claim 1, said physical parameter to be measured being a component of the speed of rotation of said gyroscope.

13. An inertial attitude or navigation unit including at least one gyroscope that includes a measurement system according to claim 1, said physical parameter to be measured being a component of the speed of rotation of said gyroscope.

14. The measurement system according to claim 3, wherein the application of the additional sequential digital demodulation code to a signal consists in applying to this signal at least one mathematical operation, except for a Fourier transform.

* * * * *